US007061997B1

(12) United States Patent
Eberlein et al.

(10) Patent No.: US 7,061,997 B1
(45) Date of Patent: Jun. 13, 2006

(54) METHOD AND APPARATUS FOR FINE FREQUENCY SYNCHRONIZATION IN MULTI-CARRIER DEMODULATION SYSTEMS

(75) Inventors: Ernst Eberlein, Grossenseebach (DE); Sabah Badri, Erlangen (DE); Stefan Lipp, Erlangen (DE); Stephan Buchholz, Munich (DE); Albert Heuberger, Erlangen (DE); Heinz Gerhaeuser, Waischenfeld (DE)

(73) Assignee: Fraunhofer-Gesellschaft zur Foerderung der angewandten Forschung e.V., Munich (DE)

( * ) Notice: Subject to any disclaimer, the term of this patent is extended or adjusted under 35 U.S.C. 154(b) by 0 days.

(21) Appl. No.: 09/673,270
(22) PCT Filed: Apr. 14, 1998
(86) PCT No.: PCT/EP98/02184

§ 371 (c)(1),
(2), (4) Date: Nov. 29, 2000

(87) PCT Pub. No.: WO99/53667

PCT Pub. Date: Oct. 21, 1999

(51) Int. Cl.
H03D 3/22 (2006.01)
H01J 11/00 (2006.01)
(52) U.S. Cl. ........................ 375/332; 370/210
(58) Field of Classification Search ............. 375/332, 375/200; 370/203, 200, 207, 480, 210
See application file for complete search history.

(56) References Cited

U.S. PATENT DOCUMENTS 4,347,483 A * 8/1982 Flasza et al. ............. 331/12
5,267,273 A * 11/1993 Dartois et al. ............ 375/355
5,345,440 A * 9/1994 Gledhill et al. ........... 370/210

(Continued)

FOREIGN PATENT DOCUMENTS

EP 0822682 2/1998

(Continued)

OTHER PUBLICATIONS

Keller and Hanzo; "Orthogonal Frequency Division Multiplex Synchronisation Techniques for Wireless Local Area Networks", *IEEE International Symposium on Personal, Indoor and Mobile Radio Communications*, pp. 963-967 (Oct. 1996).

(Continued)

*Primary Examiner*—Stephen Chin
*Assistant Examiner*—Cicely Ware
(74) *Attorney, Agent, or Firm*—Roylance,Abrams,Berdo & Goodman, L.L.P.

(57) ABSTRACT

A method and an apparatus relating to a fine frequency synchronization compensating for a carrier frequency deviation from an oscillator frequency in a multi-carrier demodulation system of the type capable of carrying out a differential phase decoding of multi-carrier modulated signals, the signals comprising a plurality of symbols, each symbol being defined by phase differences between simultaneous carriers having different frequencies. A phase difference between phases of the same carrier in different symbols is determined. Thereafter, a frequency offset is determined by eliminating phase shift uncertainties related to the transmitted information from the phase difference making use of a M-PSK decision device. Finally, a feedback correction of the carrier frequency deviation is performed based on the determined frequency offset. Alternatively, an averaged frequency offset can be determined by averaging determined frequency offsets of a plurality of carriers. Then, the feedback correction of the frequency deviation is performed based on the averaged frequency offset.

7 Claims, 13 Drawing Sheets

U.S. PATENT DOCUMENTS

| | | | | |
|---|---|---|---|---|
| 5,694,389 | A | * 12/1997 | Seki et al. | 370/208 |
| 5,771,224 | A | 6/1998 | Seki et al. | 370/206 |
| 6,192,068 | B1 * | 2/2001 | Fattouche et al. | 375/130 |
| 6,219,333 | B1 * | 4/2001 | Ahn | 370/203 |
| 6,226,337 | B1 * | 5/2001 | Klank et al. | 375/367 |

FOREIGN PATENT DOCUMENTS

| | | |
|---|---|---|
| JP | 8265293 | 10/1996 |
| JP | 1041991 | 2/1998 |
| WO | 9205646 | 4/1992 |
| WO | 9800946 | 1/1998 |

OTHER PUBLICATIONS

Moose, "A Technique for Orthogonal Frequency Division Multiplexing Frequency Offset Correction", *IEEE Transactions on Communications*, vol. 42, No. 10, pp. 2908-2914 (Oct. 1994).

Classen and Meyr, "Synchronization Algorithms for an OFDM System for Mobile Communication", Condierung für Quelle, Kanal and Übertragung: ITG-Fachbericht, pp. 105-114 (Oct. 1994).

Schmidl and Cox, "Low-Overhead, Low-Complexity [Burst] Synchronization for OFDM", *Proc. IEEE Int. Conf. on Commun.*, pp. 1301-1306 (1996).

Zou and Wu, "COFDM: An Overview", *IEEE Transactions on Broadcasting*, vol. 41, No. 1, pp. 1-8 (Mar. 1995).

Palacherla, "DSP-µP Routine Computes Magnitude", *EDN Electrical Design News*, vol. 34, No. 22, pp. 225-226 (Oct. 1989).

Adams and Brady, "Magnitude Approxmations for Microprocessor Implementation", *IEEE Micro*, vol. 3, No. 5, pp. 27-31 (Oct. 1983).

Luise and Regiannini, "Carrier Frequency Acquisition and Tracking for OFDM Systems", *IEEE Transactions on Communications*, vol. 44, No. 11, pp. 1590-1598 (Nov. 1996).

Tuisel and Kammeyer, "Carrier-Recovery for Multicarrier-Transmission Over Mobile Radio Channels", *Int. Conf. on Acoustics, Speech and Signal Processing (ICASSP 92)*, San Francisco, Band 4, pp. 677-680 (1992).

Moose, "Differentially Coded Multi-Frequency Modulation for Digital Communications", *Signal Processing V—Theories and Applications*, Proceedings of EUSIPCO-90 Fifth European Signal Processing Conference, Barcelona, Spain, vol. III, pp. 1807-1810 (Sep. 1990).

* cited by examiner

⊘ MCM Symbol-1
⊘ MCM Symbol-2

METHOD AND APPARATUS FOR FINE FREQUENCY SYNCHRONIZATION IN MULTI-CARRIER DEMODULATION SYSTEMS

This application is a 371 of PCT/EP98/02184 Apr. 14, 1998.

FIELD OF THE INVENTION

The present invention relates to methods and apparatus for performing a fine frequency synchronization in multi-carrier demodulation systems, and in particular to methods and apparatus for performing a fine frequency synchronization compensating for a carrier frequency deviation from an oscillator frequency in a multi-carrier demodulation system of the type capable of carrying out a differential phase decoding of multi-carrier modulated signals, wherein the signals comprise a plurality of symbols, each symbol being defined by phase differences between simultaneous carriers having different frequencies.

BACKGROUND OF THE INVENTION

In a multi carrier transmission system (MCM, OFDM), the effect of a carrier frequency offset is substantially more considerable than in a single carrier transmission system. MCM is more sensitive to phase noise and frequency offset which occurs as amplitude distortion and inter carrier interference (ICI). The inter carrier interference has the effect that the subcarriers are no longer orthogonal in relation to each other. Frequency offsets occur after power on or also later due to frequency deviation of the oscillators used for down-conversion into baseband. Typical accuracies for the frequency of a free running oscillator are about ±50 ppm of the carrier frequency. With a carrier frequency in the S-band of 2.34 Ghz, for example, there will be a maximum local oscillator (LO) frequency deviation of above 100 kHz (117.25 kHz). The above named effects result in high requirements on the algorithm used for frequency offset correction.

DESCRIPTION OF PRIOR ART

Most prior art algorithms for frequency synchronization divide frequency correction into two stages. In the first stage, a coarse synchronization is performed. In the second stage, a fine correction can be achieved. A frequently used algorithm for coarse synchronization of the carrier frequency uses a synchronization symbol which has a special spectral pattern in the frequency domain. Such a synchronization symbol is, for example, a CAZAC sequence (CAZAC=Constant Amplitude zero Autocorrelation). Through comparison, i.e. the correlation, of the power spectrum of the received signal with that of the transmitted signal, the frequency carrier offset can be coarsely estimated. These prior art algorithms all work in the frequency domain. Reference is made, for example, to Ferdinand Claβen, Heinrich Meyr, "Synchronization Algorithms for an OFDM System for Mobile Communication", ITG-Fachtagung 130, Codierung für Quelle, Kanal und Übertragung, pp. 105–113, Oct. 26–28, 1994; and Timothy M. Schmidl, Donald C. Cox, "Low-overhead, Low-Complexity [Burst] synchronization for OFDM", in Proceedings of the IEEE International conference on communication ICC 1996, pp. 1301–1306 (1996).

For the coarse synchronization of the carrier frequency, Paul H. Moose, "A Technique for orthogonal Frequency Division Multiplexing Frequency offset Correction", IEEE Transaction on communications, Vol. 42, No. 10, October 1994, suggest increasing the spacing between the subcarriers such that the subcarrier distance is greater than the maximum frequency difference between the received and transmitted carriers. The subcarrier distance is increased by reducing the number of sample values which are transformed by the Fast Fourier Transform. This corresponds to a reduction of the number of sampling values which are transformed by the Fast Fourier Transform.

WO 9205646 A relates to methods for the reception of orthogonal frequency division multiplexed signals comprising data which are preferably differentially coded in the direction of the time axis. Phase drift of the demodulated samples from one block to the next is used to indicate the degree of local oscillator frequency error. Phase drift is assessed by multiplying complex values by the complex conjugate of an earlier sample demodulated from the same OFDM carrier and using the resulting measure to steer the local oscillator frequency via a frequency locked loop.

SUMMARY OF THE INVENTION

It is an object of the present invention to provide methods and apparatus for performing a fine frequency synchronization which allow a fine frequency synchronization compensating for a carrier frequency deviation from an oscillator frequency in a MCM transmission system which makes use of MCM signals in which information is differential phase encoded between simultaneous sub-carriers having different frequencies.

In accordance with a first aspect, the present invention provides a method of performing a fine frequency synchronization compensating for a carrier frequency deviation from an oscillator frequency in a multi-carrier demodulation system of the type capable of carrying out a differential phase decoding of multi-carrier modulated signals, the signals comprising a plurality of symbols, each symbol being defined by phase differences between simultaneous carriers having different frequencies, the method comprising the steps of:

determining a phase difference between phases of the same carrier in different symbols;

determining a frequency offset by eliminating phase shift uncertainties related to the transmitted information from the phase difference making use of a M-PSK decision device; and performing a feedback correction of the carrier frequency deviation based on the determined frequency offset.

In accordance with a second aspect, the present invention provides a method of performing a fine frequency synchronization compensating for a carrier frequency deviation from an oscillator frequency in a multi-carrier demodulation system of the type capable of carrying out a differential phase decoding of multi-carrier modulated signals, the signals comprising a plurality of symbols, each symbol being defined by phase differences between simultaneous carriers having different frequencies, the method comprising the steps of:

determining respective phases of the same carrier in different symbols;

eliminating phase shift uncertainties related to the transmitted information from the phases to determine respective phase deviations making use of a M-PSK decision device;

determining a frequency offset by determining a phase difference between the phase deviations; and performing a feedback correction of said carrier frequency deviation based on the determined frequency offset.

In accordance with a third aspect, the present invention provides an apparatus for performing a fine frequency synchronization compensating for a carrier frequency deviation from an oscillator frequency, for a multi-carrier demodulation system of the type capable of carrying out a differential phase decoding of multi-carrier modulated signals, the signals comprising a plurality of symbols, each symbol being defined by phase differences between simultaneous carriers having different frequencies, the apparatus comprising:

means for determining a phase difference between phases of the same carrier in different symbols;

M-PSK decision device for determining a frequency offset by eliminating phase shift uncertainties related to the transmitted information from the phase difference; and means for performing a feedback correction of the frequency deviation based on the determined frequency offset.

In accordance with a fourth aspect, the present invention provides an apparatus for performing a fine frequency synchronization compensating for a carrier frequency deviation from an oscillator frequency, for a multi-carrier demodulation system of the type capable of carrying out a differential phase decoding of multi-carrier modulated signals, said signals comprising a plurality of symbols, each symbol being defined by phase differences between simultaneous carriers having different frequencies, the apparatus comprising:

means for determining respective phases of the same carrier in different symbols;

M-PSK decision device for eliminating phase shift uncertainties related to the transmitted information from the phases to determine respective phase deviations;

means for determining a frequency offset by determining a phase difference between the phase deviations; and means for performing a feedback correction of the frequency deviation based on the determined frequency offset.

The present invention relates to methods and apparatus for performing a fine frequency synchronization compensating for a carrier frequency deviation from an oscillator frequency. This fine frequency synchronization is preferably performed after completion of a coarse frequency synchronization, such that the frequency offsets after the coarse frequency synchronization are smaller than half the sub-carrier distance in the MCM signal. Since the frequency offsets which are to be corrected by the inventive fine frequency synchronization methods and apparatus, a correction of the frequency offsets by using a phase rotation with differential decoding and de-mapping in the time axis can be used. The frequency offsets are detected by determining the frequency differences between time contiguous sub-carrier symbols along the time axis. The frequency error is calculated by measuring the rotation of the I-Q Cartesian coordinates of each sub-carrier and, in preferred embodiments, averaging them over all n sub-carriers of a MCM symbol.

Firstly, the phase ambiguity or uncertainty is eliminated by using a M-PSK decision device and correlating the output of the decision device with the input signal for a respective sub-carrier symbol. Thus, the phase offset for a sub-carrier symbol is determined and can be used for restructuring the frequency error in form of a feed-backward structure. Alternatively, the phase offsets of the sub-carrier symbols of one MCM symbol can be averaged over all of the active carriers of a MCM symbol, wherein the averaged phase offset is used to restructure the frequency error.

In accordance with the present invention, the determination of the frequency offset is performed in the frequency domain. The feedback correction in accordance with the inventive fine frequency synchronization is performed in the time domain. To this end, a differential decoder in the time domain is provided in order to detect frequency offsets of sub-carriers on the basis of the phases of timely successive sub-carrier symbols of different MCM symbols.

BRIEF DESCRIPTION OF THE DRAWINGS

In the following, preferred embodiments of the present invention will be explained in detail on the basis of the drawings enclosed, in which.

DETAILED DESCRIPTION OF THE EMBODIMENTS

Figure 1:
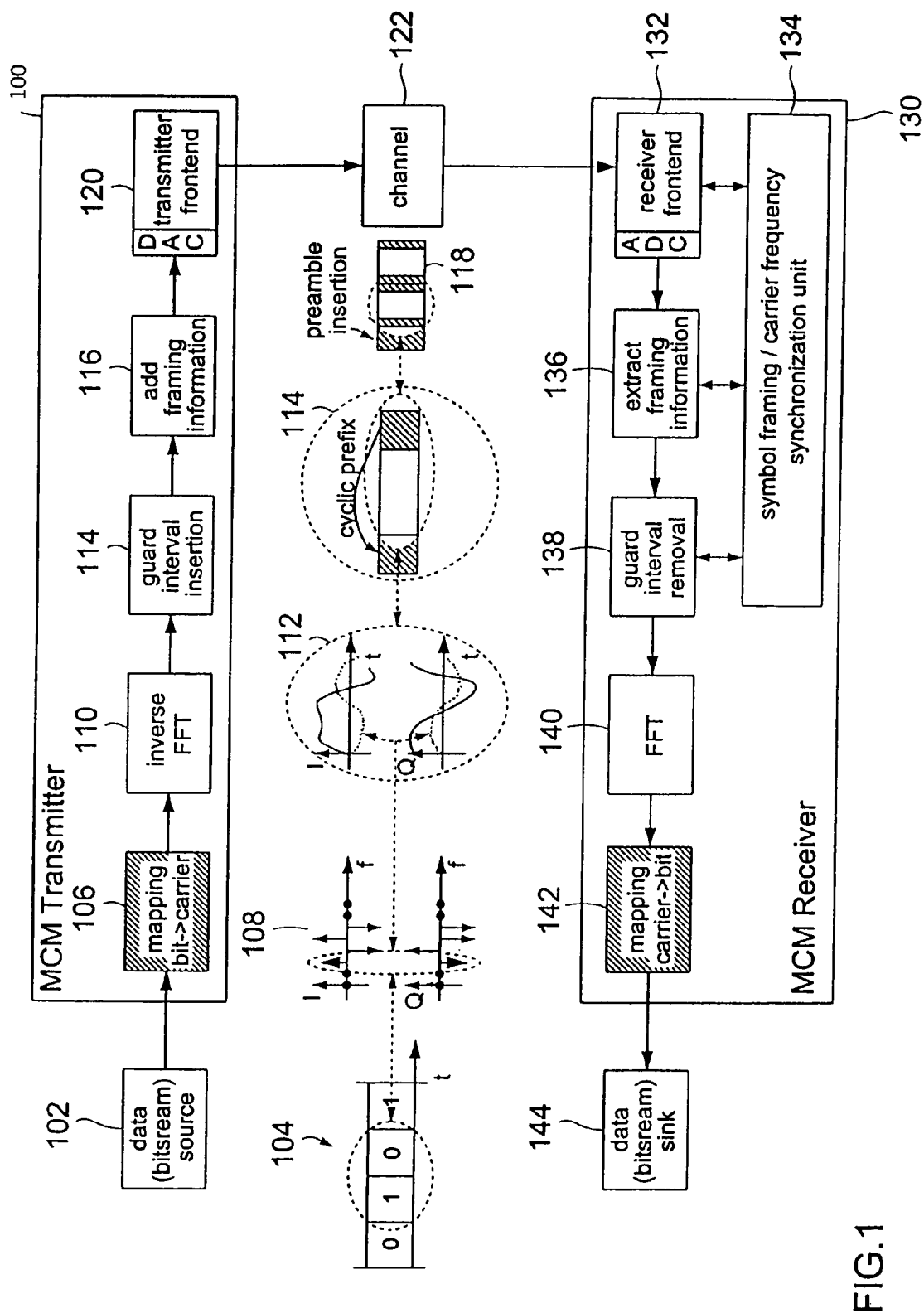
FIG. 1 shows a schematic overview of a MCM transmission system to which the present application can be applied.

Before discussing the present invention in detail, the mode of operation of a MCM transmission system is described referring to FIG. 1.

Referring to FIG. 1, at 100 a MCM transmitter is shown that substantially corresponds to a prior art MCM transmitter. A description of such a MCM transmitter can be found, for example, in William Y. Zou, Yiyan Wu, "COFDM: AN OVERVIEW", IEEE Transactions on Broadcasting, vol. 41, No. 1, March 1995.

A data source 102 provides a serial bitstream 104 to the MCM transmitter. The incoming serial bitstream 104 is applied to a bit-carrier mapper 106 which produces a sequence of spectra 108 from the incoming serial bitstream 104. An inverse fast Fourier transform (IFFT) 110 is performed on the sequence of spectra 108 in order to produce a MCM time domain signal 112. The MCM time domain signal forms the useful MCM symbol of the MCM time signal. To avoid intersymbol interference (ISI) caused by multipath distortion, a unit 114 is provided for inserting a guard interval of fixed length between adjacent MCM symbols in time. In accordance with a preferred embodiment of the present invention, the last part of the useful MCM symbol is used as the guard interval by placing same in front of the useful symbol. The resulting MCM symbol is shown at 115 in FIG. 1 and corresponds to a MCM symbol 160 depicted in FIG. 11.

Figure 11:
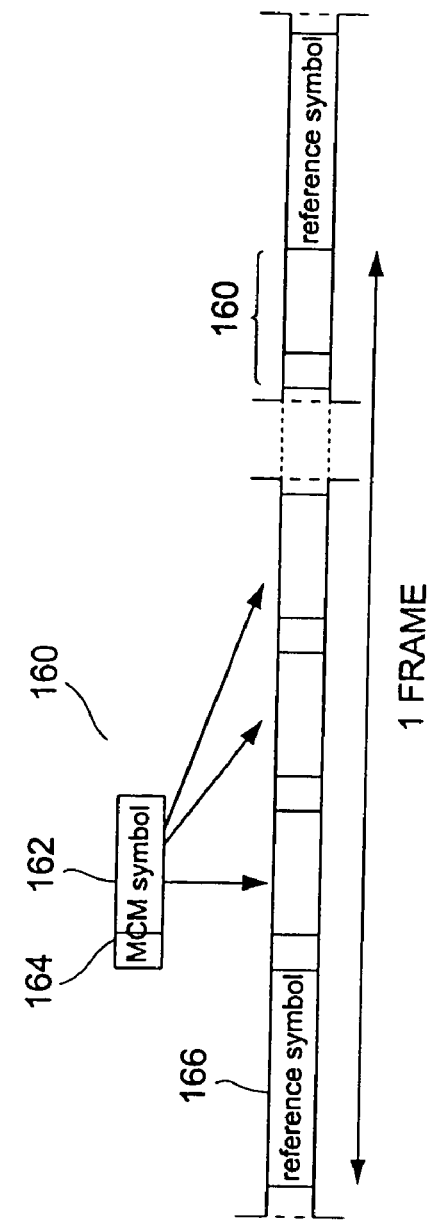
FIG. 11 shows a schematic view of a typical MCM signal having a frame structure.

FIG. 11 shows the construction of a typical MCM signal having a frame structure. One frame of the MCM time signal is composed of a plurality of MCM symbols 160. Each MCM symbol 160 is formed by an useful symbol 162 and a guard interval 164 associated therewith. AS shown in FIG. 11, each frame comprises one reference symbol 166. The present invention can advantageously be used with such a MCM signal, however, such a signal structure being not necessary for performing the present invention as long as the transmitted signal comprises a useful portion and at least one reference symbol.

In order to obtain the final frame structure shown in FIG. 11, a unit 116 for adding a reference symbol for each predetermined number of MCM symbols is provided.

In accordance with the present invention, the reference symbol is an amplitude modulated bit sequence. Thus, an amplitude modulation of a bit sequence is performed such that the envelope of the amplitude modulated bit sequence defines a reference pattern of the reference symbol. This reference pattern defined by the envelope of the amplitude modulated bit sequence has to be detected when receiving the MCM signal at a MCM receiver. In a preferred embodiment of the present invention, a pseudo random bit sequence having good autocorrelation properties is used as the bit sequence that is amplitude modulated.

The choice of length and repetition rate of the reference symbol depends on the properties of the channel through which the MCM signal is transmitted, e.g. the coherence time of the channel. In addition, the repetition rate and the length of the reference symbol, in other words the number of useful symbols in each frame, depends on the receiver requirements concerning mean time for initial synchronization and mean time for resynchronization after synchronization loss due to a channel fade.

The resulting MCM signal having the structure shown at 118 in FIG. 1 is applied to the transmitter front end 120. Roughly speaking, at the transmitter front end 120, a digital/analog conversion and an up-converting of the MCM signal is performed. Thereafter, the MCM signal is transmitted through a channel 122.

Following, the mode of operation of a MCM receiver 130 is shortly described referring to FIG. 1. The MCM signal is received at the receiver front end 132. In the receiver front end 132, the MCM signal is down-converted and, furthermore, an analog/digital conversion of the down-converted signal is performed.

The down-converted MCM signal is provided to a symbol frame/carrier frequency synchronization unit 134.

A first object of the symbol frame/carrier frequency synchronization unit 134 is to perform a frame synchronization on the basis of the amplitude-modulated reference symbol. This frame synchronization is performed on the basis of a correlation between the amplitude-demodulated reference symbol and a predetermined reference pattern stored in the MCM receiver.

A second object of the symbol frame/carrier frequency synchronization unit is to perform a coarse frequency synchronization of the MCM signal. To this end, the symbol frame/carrier frequency synchronization unit 134 serves as a coarse frequency synchronization unit for determining a coarse frequency offset of the carrier frequence caused, for example, by a difference of the frequencies between the local oscillator of the transmitter and the local oscillator of the receiver. The determined frequency is used in order to perform a coarse frequency correction. The mode of operation of the coarse frequency synchronization unit is described in detail referring to FIGS. 9 and 10 hereinafter.

As described above, the frame synchronization unit 134 determines the location of the reference symbol in the MCM symbol. Based on the determination of the frame synchronization unit 134, a reference symbol extracting unit 136 extracts the framing information, i.e. the reference symbol, from the MCM symbol coming from the receiver front end 132. After the extraction of the reference symbol, the MCM signal is applied to a guard interval removal unit 138. The result of the signal processing performed hereherto in the MCM receiver are the useful MCM symbols.

The useful MCM symbols output from the guard interval removal unit 138 are provided to a fast Fourier transform unit 140 in order to provide a sequence of spectra from the useful symbols. Thereafter, the sequence of spectra is provided to a carrier-bit mapper 142 in which the serial bitstream is recovered. This serial bitstream is provided to a data sink 144.

Figure 2B:
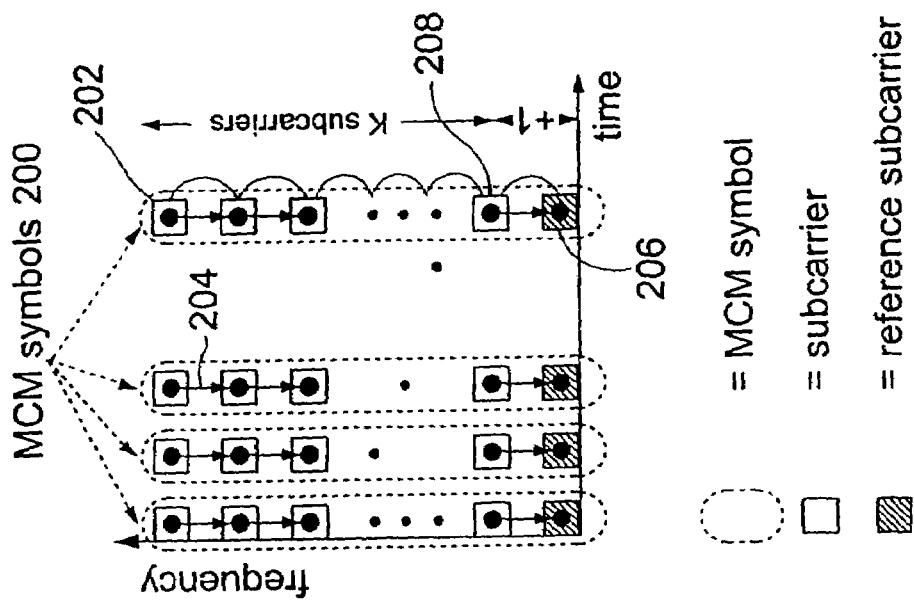
FIGS. 2A and 2B show schematic views representing a scheme for differential mapping in the time axis and a scheme for differential mapping in the frequency axis.
Figure 2A:
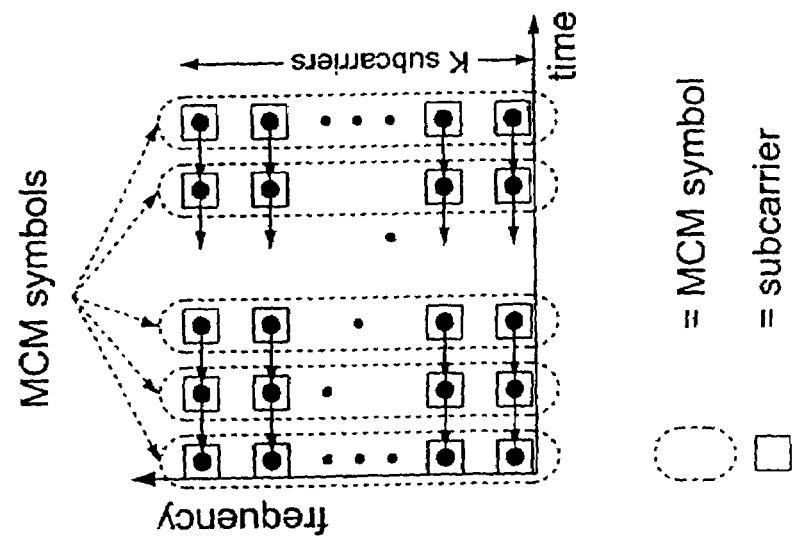

Next, referring to FIGS. 2A and 2B, two modes for differential mapping are described. In FIG. 2A, a first method of differential mapping along the time axis is shown. AS can be seen from FIG. 2A, a MCM symbol consists of K subcarriers. The sub-carriers comprise different frequencies and are, in a preferred embodiment, equally spaced in the frequency axis direction. When using differential mapping along the time axis, one or more bits are encoded into phase and/or amplitude shifts between two sub-carriers of the same center frequency in adjacent MCM symbols. The arrows depicted between the sub-carrier symbols correspond to information encoded in amplitude and/or phase shifts between two sub-carrier symbols.

A second method of differential mapping is shown in FIG. 2B. The present invention is adapted for MCM transmission system using the mapping scheme shown in FIG. 2B. This mapping scheme is based on a differential mapping inside one MCM symbol along the frequency axis. A number of MCM symbols 200 are shown in FIG. 2B. Each MCM symbol 200 comprises a number of sub-carrier symbols 202. The arrows 204 in FIG. 2B illustrate information encoded between two sub-carrier symbols 202. As can be seen from the arrows 204, this mapping scheme is based on a differential mapping within one MCM symbol along the frequency axis direction.

In the embodiment shown in FIG. 2B, the first sub-carrier (k=0) in an MCM symbol 200 is used as a reference sub-carrier 206 (shaded) such that information is encoded between the reference sub-carrier and the first active carrier 208. The other information of a MCM symbol 200 is encoded between active carriers, respectively.

Thus, for every MCM symbol an absolute phase reference exists. In accordance with FIG. 2B, this absolute phase reference is supplied by a reference symbol inserted into every MCM symbol (k=0). The reference symbol can either have a constant phase for all MCM symbols or a phase that varies from MCM symbol to MCM symbol. A varying phase can be obtained by replicating the phase from the last subcarrier of the MCM symbol preceding in time.

Figure 3:
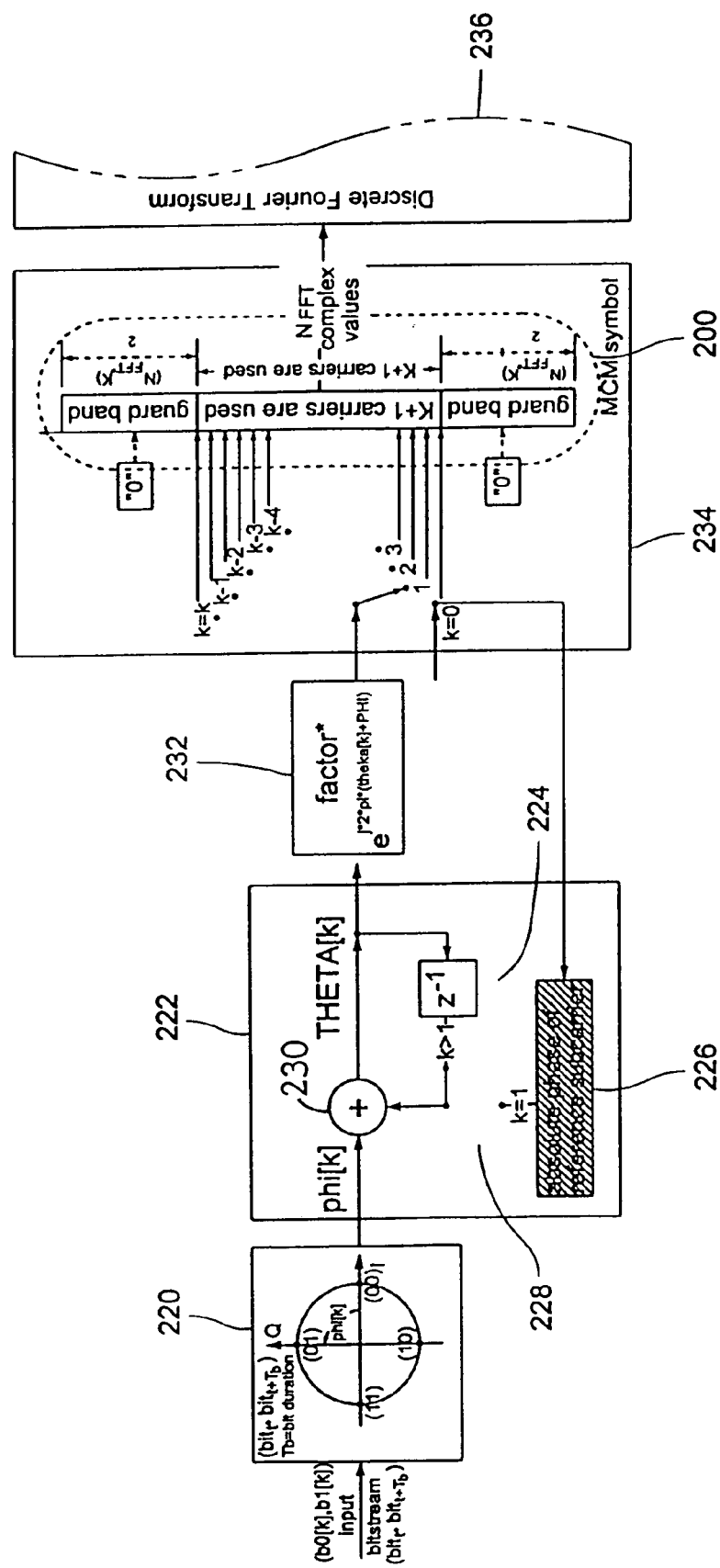
FIG. 3 shows a functional block diagram for performing a differential mapping in the frequency axis.

In FIG. 3 a preferred embodiment of a device for performing a differential mapping along the frequency axis is shown. Referring to FIG. 3, assembly of MCM symbols in the frequency domain using differential mapping along the frequency axis according to the present invention is described.

FIG. 3 shows the assembly of one MCM symbol with the following parameters:

NFFT designates the number of complex coefficients of the discrete Fourier transform, number of subcarriers respectively.

K designates the number of active carriers. The reference carrier is not included in the count for K.

According to FIG. 3, a quadrature phase shift keying (QPSK) is used for mapping the bitstream onto the complex symbols. However, other M-ary mapping schemes (MPSK) like 2-PSK, 8-PSK, 16-QAM, 16-APSK, 64-APSK etc. are possible.

Furthermore, for ease of filtering and minimization of aliasing effects some subcarriers are not used for encoding information in the device shown in FIG. 3. These subcarriers, which are set to zero, constitute the so-called guard bands on the upper and lower edges of the MCM signal spectrum. At the input of the mapping device shown in FIG. 3, complex signal pairs b0[k], b1[k] of an input bitstream are received. K complex signal pairs are assembled in order to form one MCM symbol. The signal pairs are encoded into the K differential phase shifts phi[k] needed for assembly of one MCM symbol. In this embodiment, mapping from Bits to the 0, 90, 180 and 270 degrees phase shifts is performed using Gray Mapping in a quadrature phase shift keying device 220.

Gray mapping is used to prevent that differential detection phase errors smaller than 135 degrees cause double bit errors at the receiver.

Differential phase encoding of the K phases is performed in a differential phase encoder 222. At this stage of processing, the K phases phi[k] generated by the QPSK Gray mapper are differentially encoded. In principal, a feedback loop 224 calculates a cumulative sum over all K phases. As starting point for the first computation (k=0) the phase of the reference carrier 226 is used. A switch 228 is provided in order to provide either the absolute phase of the reference subcarrier 226 or the phase information encoded onto the preceding (i.e. $z^{-1}$, where $z^{-1}$ denotes the unit delay operator) subcarrier to a summing point 230. At the output of the differential phase encoder 222, the phase information theta [k] with which the respective subcarriers are to be encoded is provided. In preferred embodiments of the present invention, the subcarriers of a MCM symbol are equally spaced in the frequency axis direction.

The output of the differential phase encoder 222 is connected to a unit 232 for generating complex subcarrier symbols using the phase information theta[k]. To this end, the K differentially encoded phases are converted to complex symbols by multiplication with $$\text{factor} * e^{j*[2*pi*(theta[k]+PHI)]} \quad \text{(Eq.1)}$$

wherein factor designates a scale factor and PHI designates an additional angle. The scale factor and the additional angle PHI are optional. By choosing PHI=45° a rotated DQPSK signal constellation can be obtained.

Finally, assembly of a MCM symbol is effected in an assembling unit 234. One MCM symbol comprising $N_{FFT}$ subcarriers is assembled from $N_{FFT}$-K-1 guard band symbols which are "zero", one reference subcarrier symbol and K DQPSK subcarrier symbols. Thus, the assembled MCM symbol 200 is composed of K complex values containing the encoded information, two guard bands at both sides of the $N_{FFT}$ complex values and a reference subcarrier symbol.

The MCM symbol has been assembled in the frequency domain. For transformation into the time domain an inverse discrete Fourier transform (IDFT) of the output of the assembling unit 234 is performed by a transformator 236. In preferred embodiments of the present invention, the transformator 236 is adapted to perform a fast Fourier transform (FFT).

Further processing of the MCM signal in the transmitter as well as in the receiver is as described above referring to FIG. 1.

At the receiver a de-mapping device 142 (FIG. 1) is needed to reverse the operations of the mapping device described above referring to FIG. 3. The implementation of the de-mapping device is straightforward and, therefore, need not be described herein in detail.

The differential mapping along the frequency axis direction is suitable for multi-carrier (OFCM) digital broadcasting over rapidly changing multi path channels. In accordance with this mapping scheme, there is no need for a channel stationarity exceeding one multi-carrier symbol. However, differential mapping into frequency axis direction may create a new problem. In multi path environments, path echoes succeeding or preceding the main path can lead to systematic phase offsets between sub-carriers in the same MCM symbol. Thus, it will be preferred to provide a correction unit in order to eliminate such phase offsets. Because the channel induced phase offsets between differential demodulated symbols are systematic errors, they can be corrected by an algorithm. In principle, such an algorithm must calculate the echo induced phase offset from the signal space constellation following the differential demodulation and subsequently correct this phase offset.

Examples for such echo phase correction algorithms are described at the end of this specification referring to FIGS. 12 to 15.

Next, the fine frequency synchronization in accordance with the present invention will be described referring to FIGS. 4 to 8. As mentioned above, the fine frequency synchronization in accordance with the present invention is performed after completion of the coarse frequency synchronization. Preferred embodiments of the coarse frequency synchronization which can be performed by the symbol frame/carrier frequency synchronization unit 134 are described hereinafter referring to FIGS. 9 and 10 after having described the fine frequency synchronization in accordance with the present invention.

Figure 4:
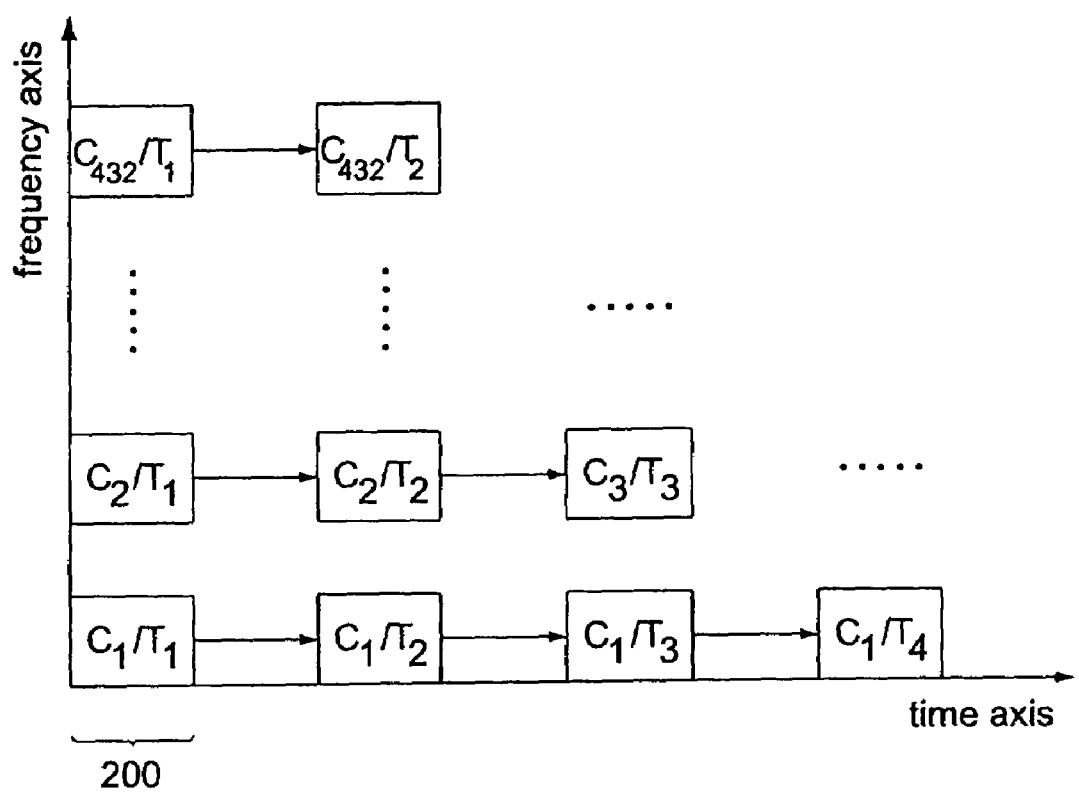
FIG. 4 shows a representation of time variation of all sub-carriers in MCM symbols.

With the fine frequency synchronization in accordance with the present invention frequency offsets which are smaller than half the sub-carrier distance can be corrected. Since the frequency offsets are low and equal for all sub-carriers the problem of fine frequency synchronization is reduced to sub-carrier level. FIG. 4 is a schematical view of MCM symbols 200 in the time-frequency plane. Each MCM symbol 200 consists of 432 sub-carrier symbols $C_1$ to $C_{432}$. The MCM symbols are arranged along the time axis, the first MCM symbol 200 shown in FIG. 4 having associated therewith a time $T_1$, the next MCM symbol having associated therewith a time $T_2$ and so on. In accordance with a preferred embodiment of the present invention, the fine frequency synchronization is based on a phase rotation which is derived from the same sub-carrier of two MCM symbols which are adjacent in the time axis direction, for example $C_1/T_1$ and $C_1/T_2$.

In the following, the present invention is described referring to QPSK mapping (QPSK=Quadrature Phase Shift Keying). However, it is obvious that the present invention can be applied to any MPSK mapping, wherein M designates the number of phase states used for encoding, for example 2, 4, 8, 16 . . . .

Figure 5:
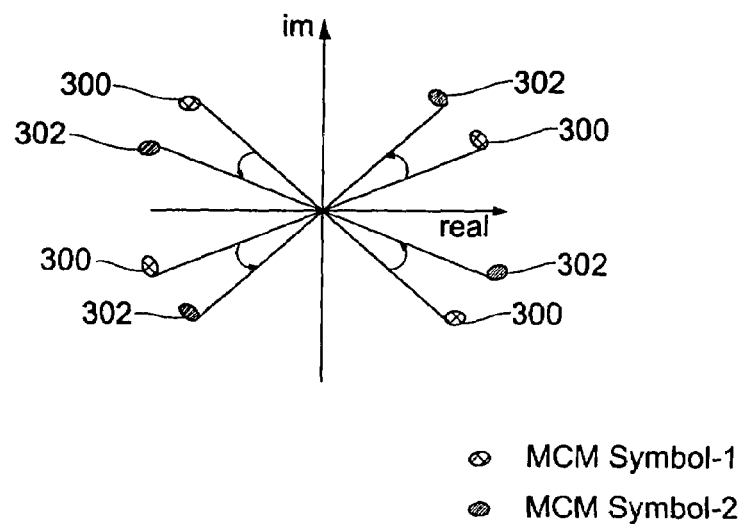
FIG. 5 shows a QPSK-constellation for each sub-carrier with a frequency offset.

FIG. 5 represents a complex coordinate system showing a QPSK constellation for each sub-carrier with frequency offset. The four possible phase positions of a first MCM symbol, MCM-symbol-1 are shown at 300. Changing from the sub-carrier (sub-carrier n) of this MCM symbol to the same sub-carrier of the next MCM symbol, MCM-symbol-2, the position in the QPSK constellation will be unchanged in case there is no frequency offset. If a frequency offset is present, which is smaller than half the distance between sub-carriers, as mentioned above, this frequency offset causes a phase rotation of the QPSK constellation of MCM-symbol-2 compared with MCM-symbol-1. The new QPSK constellation, that is the four possible phase positions for the subject sub-carrier of MCM-symbol-2 are shown at 302 in FIG. 5. This phase rotation θ can be derived from the following equation:

$$C_n(kT_{MCM}) = e^{j2\pi f_{offset}T_{MCM}} C_n((k-1)T_{MCM})$$

$$\theta = 2\pi f_{offset} T_{MCM} \qquad (Eq.2)$$

$C_n$ designates the QPSK constellation of a sub-carrier n in a MCM symbol. n is an index running from 1 to the number of active sub-carriers in the MCM symbol. Information regarding the frequency offset is contained in the term $e^{j2\pi f_{offset}T_{MCM}}$ of equation 2. This frequency offset is identical for all sub-carriers. Therefore, the phase rotation θ is identical for all sub-carriers as well. Thus, averaging overall sub-carrier of a MCM symbol can be performed.

Figure 6:
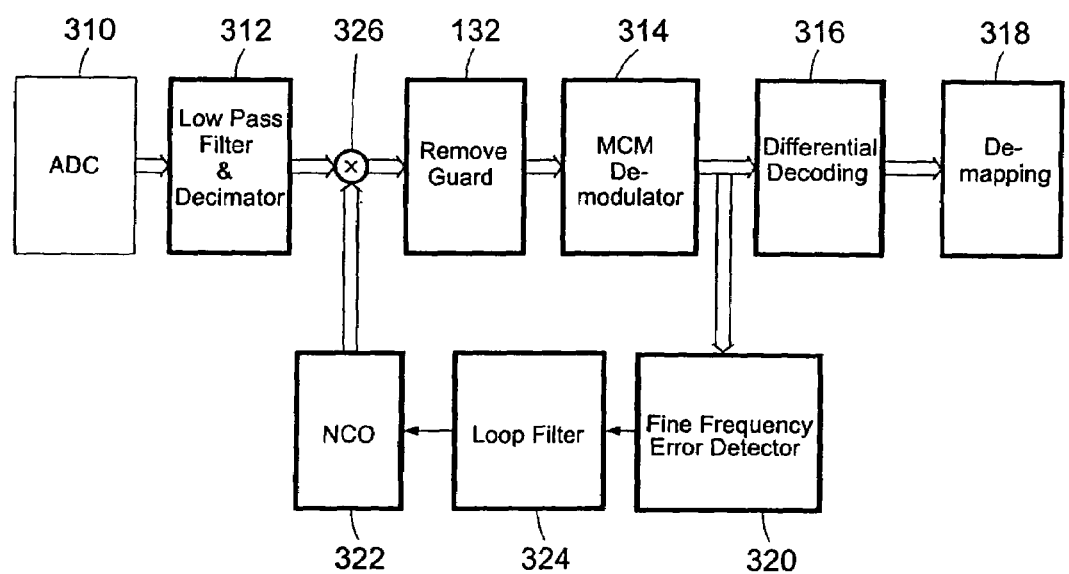
FIG. 6 shows a general block diagram illustrating the position of the inventive fine frequency synchronization device in a MCM receiver.

FIG. 6 shows a block diagram of a MCM receiver in which the present invention is implemented. An analog/digital converter 310 is provided in order to perform an analog/digital conversion of a down-converted signal received at the receiver front end 132 (FIG. 1). The output of the analog/digital converter 310 is applied to a low path filter and decimator unit 312. The low path filter is an impulse forming filter which is identical to an impulse forming filter in the MCM transmitter. In the decimator, the signal is sampled at the MCM symbol frequency. As described above referring to FIG. 1, guard intervals in the MCM signal are removed by a guard interval removal unit 132. Guard intervals are inserted between two MCM symbols in the MCM transmitter in order to avoid intersymbol interference caused by channel memory.

The output of the guard interval removal unit 132 is applied to a MCM demodulator 314 which corresponds to the fast Fourier transformator 140 shown in FIG. 1. Following the MCM demodulator 314 a differential decoding unit 316 and a de-mapping unit 318 are provided. In the differential decoding unit 316, phase information is recovered using differential decoding. In the demapping unit 318, demapping along the frequency axis direction is performed in order to reconstruct a binary signal from the complex signal input into the demapping unit 318.

The output of the MCM demodulator 314 is also applied to fine frequency error detector 320. The fine frequency error detector 320 produces a frequency error signal from the output of the MCM demodulator. In the depicted embodiment, the output of the fine frequency error detector 320 is applied to a numerical controlled oscillator 322 via a loop filter 324. The loop filter 324 is a low pass filter for filtering superimposed interference portions of a higher frequency from the slowly varying error signal. The numerical controlled oscillator 322 produces a carrier signal on the basis of the filtered error signal. The carrier signal produced by the numerical controlled oscillator 322 is used for a frequency correction which is performed by making use of a complex multiplier 326. The inputs to the complex multiplier 326 are the output of the low pass filter and decimator unit 312 and the output of the numerical controlled oscillator 322.

Figure 7:
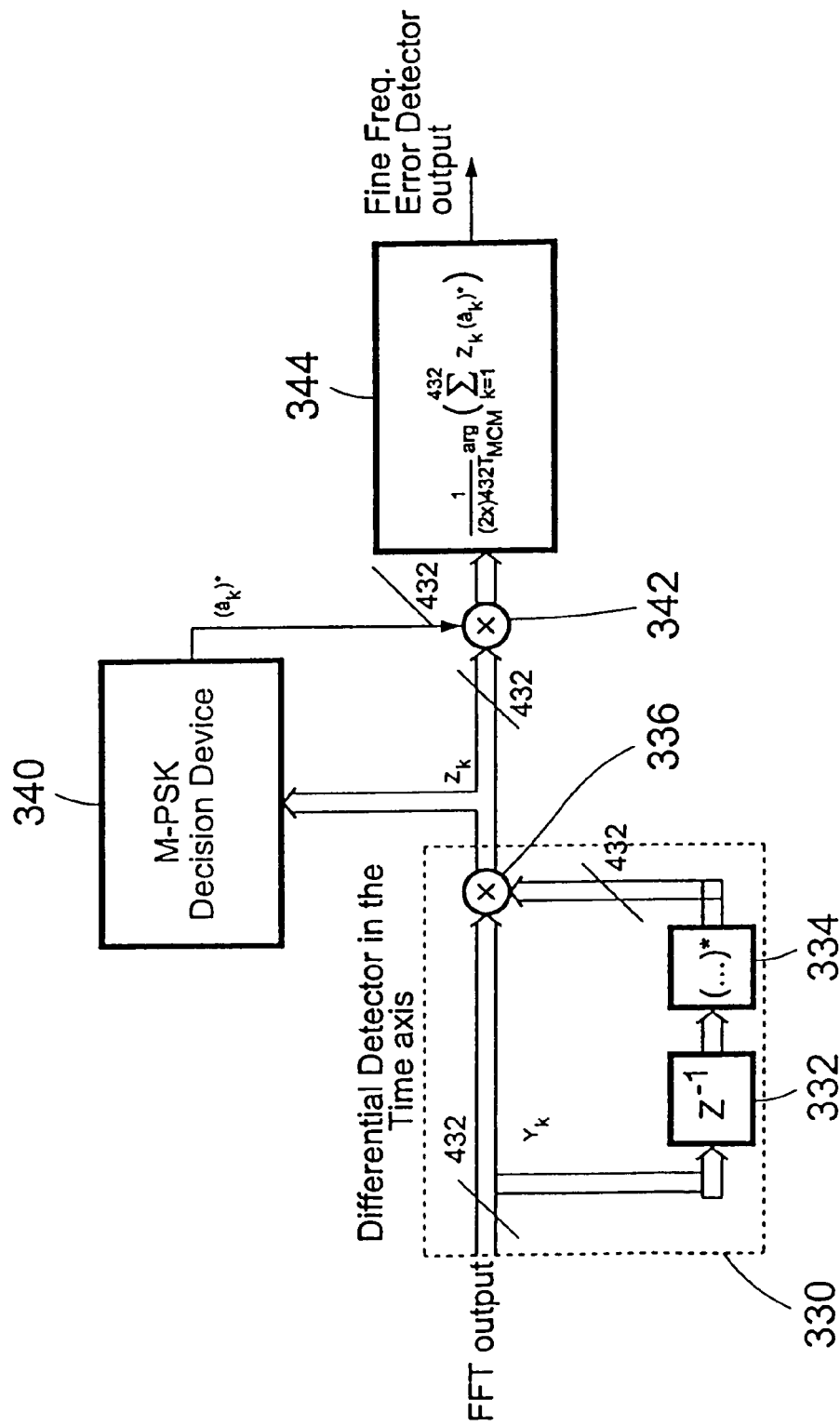
FIG. 7 shows a block diagram of the fine frequency error detector shown in FIG. 6.

A description of a preferred embodiment of the fine frequency error detector 320 is given hereinafter referring to FIG. 7.

The fine frequency error detector 320 comprises a differential detector in the time axis 330. The output of the MCM demodulator 314, i.e. the FFT output (FFT=Fast Fourier Transform) is applied to the input of the differential detector 330 which performs a differential detection in the time axis in order to derive information on a frequency offset from the same sub-carrier of two subsequently arriving MCM symbols. In the embodiment shown in FIG. 7, the number of active sub-carriers is 432. Thus, the differential detector 330 performs a correlation between the first and the 433rd sample. The first sample is associated with MCM-symbol-1 (FIG. 5), whereas the 433rd sample is associated with MCM-symbol-2 (FIG. 5). However, both of these samples are associated with the same sub-carrier.

To this end, the input signal $Y_k$ is applied to a $z^{-1}$-block 332 and thereafter to a unit 334 in order to form the complex conjugate of the output of the $z^{-1}$-block 332. A complex multiplier 336 is provided in order to multiply the output of the unit 334 by the input signal $Y_k$. The output of the multiplier 336 is a signal $Z_k$.

The function of the differential detector 330 can be expressed as follows:

$$Z_k = Y_{k+K} Y_k^* \qquad (Eq.3)$$

$$Y = [Y_1, Y_2 \ldots , Y_k \ldots ] \qquad (Eq.4)$$

$$Y = [C_1/T_1, C_2/T_1, \ldots , C_{432}/T_1, C_1/T_2 \ldots ] \qquad (Eq.5)$$

$Y_k$ designates the output of the MCM modulator 314, i.e. the input to the differential detector 330, at a time k. $Z_k$ designates the output of the differential detector 330. K designates the number of active carriers.

The output $Z_k$ of the differential detector 330 contains an M-fold uncertainty corresponding to codeable phase shifts. In case of the QPSK mapping, this M-fold uncertainty is a 4-fold uncertainty, i.e., in the 0°, 90°, 180° and 270° phase shifts. This phase shift uncertainty is eliminated from the output $Z_k$ by using an M-PSK decision device 340. Such decision devices are known in the art and, therefore, are not described here in detail. The output of the decision device 340 $(\hat{a}_k)^*$ represents the complex conjugate of the codeable phase shift decided by the decision device 340. This output of the decision device 340 is correlated with the output of the differential detector 330 by performing a complex multiplication using a multiplier 342.

The output the multiplier 342 represents the phase offset for the respective sub-carriers. The phase offsets for the respective sub-carriers are averaged over one MCM symbol in an averaging unit 344 in accordance with a preferred embodiment of the present invention. The output of the averaging units 344 represent the output of the fine frequency error detector 320.

The mathematical description for this procedure is as follows:

$$f_{offset} = \frac{1}{2\pi KT_{MCM}} \arg\left\{\sum_{n=1}^{K} Z_n \cdot (\hat{a}_n)^*\right\} \quad \text{(Eq. 6)}$$

In accordance with preferred embodiments of the present invention, the frequency control loop has a backward structure. In the embodiment shown in FIG. 6, the feedback loop is connected between the output of the MCM demodulator 314 and the input of the guard interval removal unit 132.

Figure 8:
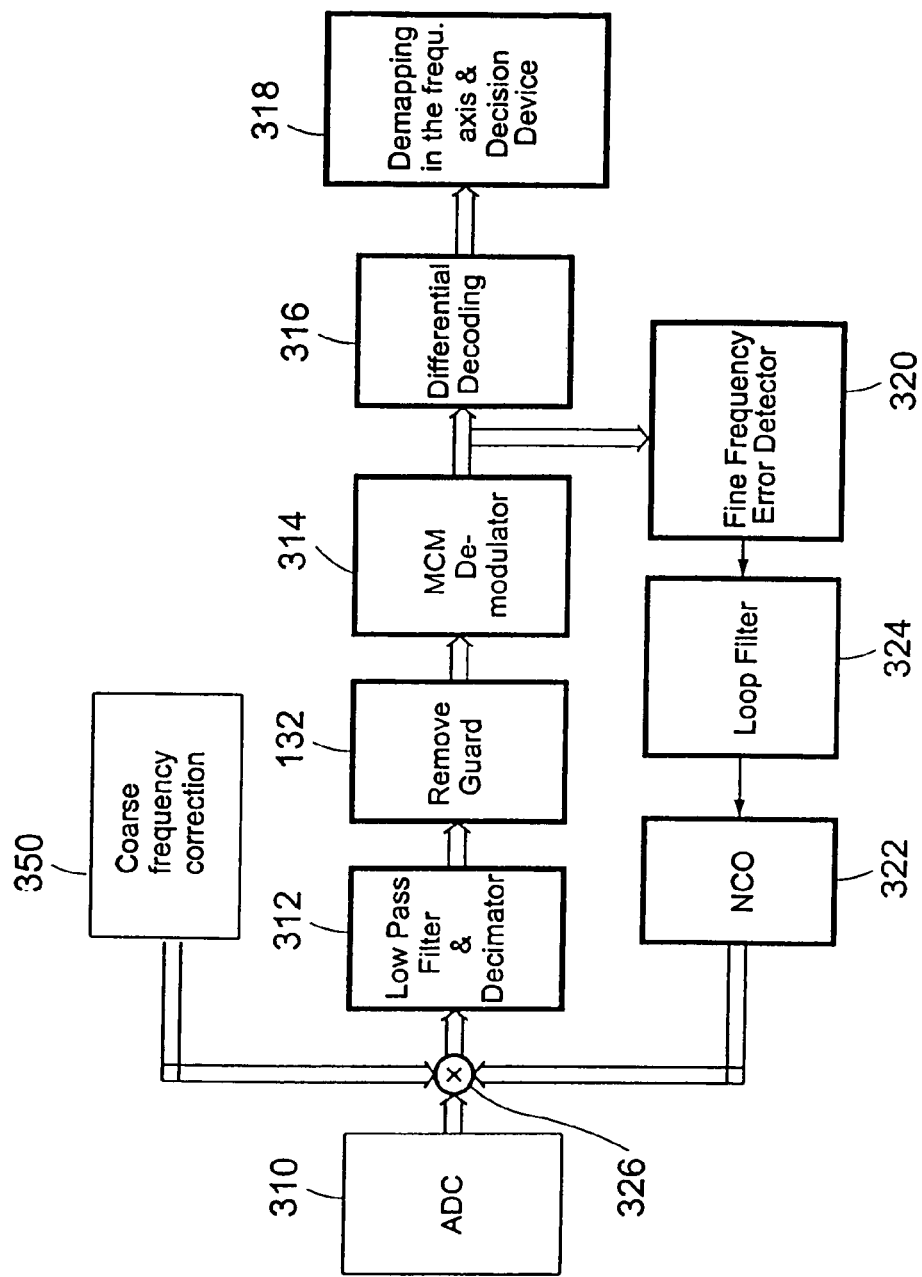
FIG. 8 shows a block diagram of a MCM receiver comprising a coarse frequency synchronization unit and a fine frequency synchronization unit.

In FIG. 8, a block diagram of a MCM receiver comprising a coarse frequency correction unit 350 and a fine frequency correction unit as described above is shown. As shown in FIG. 8, a common complex multiplier 326 can be used in order to perform the coarse frequency correction and the fine frequency correction. As shown in FIG. 8, the multiplier 326 can be provided preceding the low pass filter and decimator unit 312. Depending on the position of the multiplier 326, a hold unit has to be provided in the fine frequency synchronization feedback loop. In an alternative embodiment, it is possible to use two separate multipliers for the coarse frequency correction and for the fine frequency correction. In such a case, the multiplier for the coarse frequency correction will be arranged preceding the low path filter and decimator unit, whereas the multiplier for the fine frequency correction will be arranged following the low path filter and decimator unit.

Following, preferred embodiments for implementing a coarse frequency synchronization will be described referring to FIGS. 9 and 10.

Figure 9:
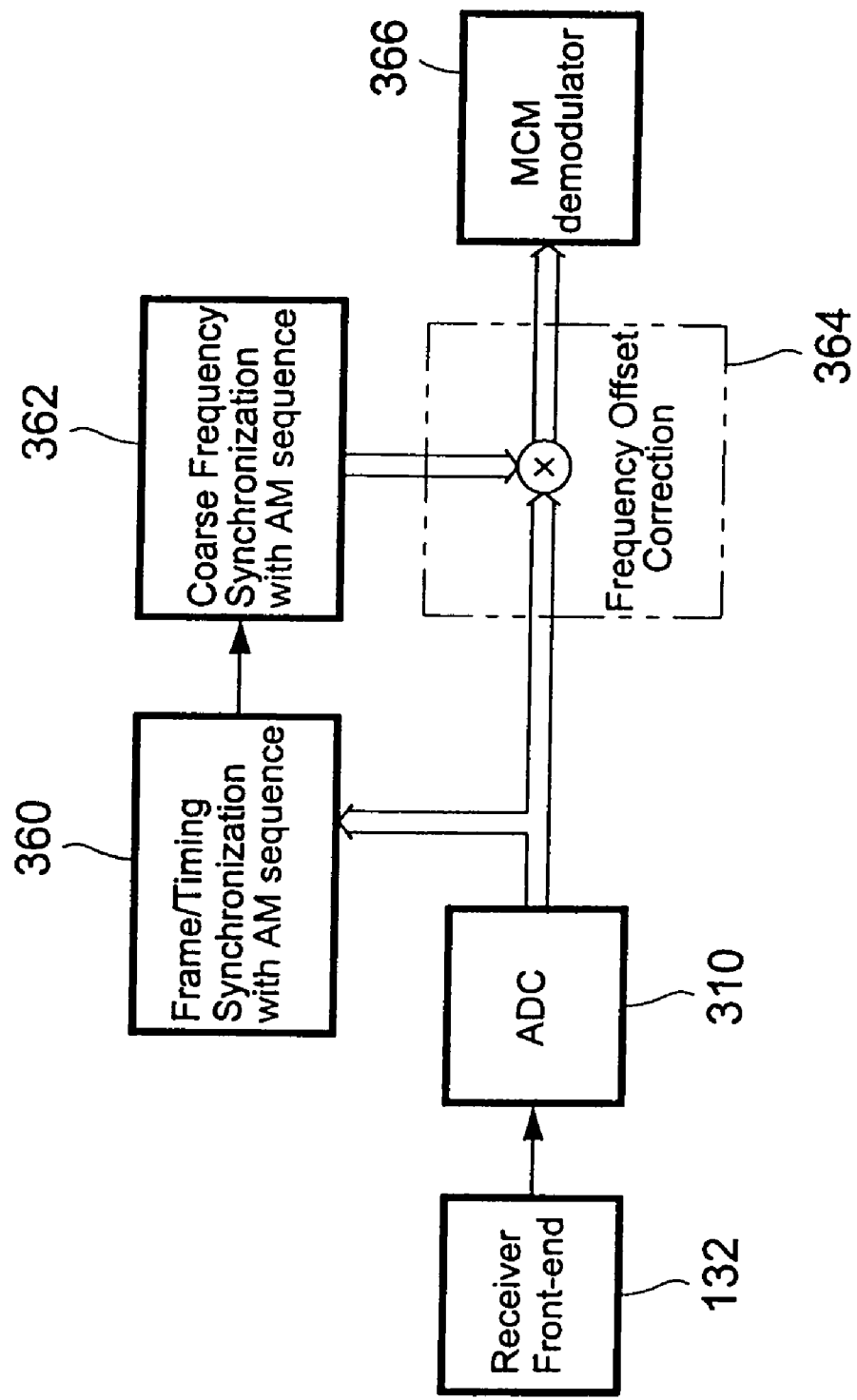
FIG. 9 shows a block diagram of a unit for performing a coarse frequency synchronization.

As it is shown in FIG. 9, the output of the receiver front end 132 is connected to an analog/digital converter 310. The down-converted MCM signal is sampled at the output of the analog/digital converter 310 and is applied to a frame/timing synchronization unit 360. In a preferred embodiment, a fast running automatic gain control (AGC) (not shown) is provided preceding the frame/timing synchronization unit in order to eliminate fast channel fluctuations. The fast AGC is used in addition to the normally slow AGC in the signal path, in the case of transmission over a multipath channel with long channel impulse response and frequency selective fading. The fast AGC adjusts the average amplitude range of the signal to the known average amplitude of the reference symbol.

As described above, the frame/timing synchronization unit uses the amplitude-modulated sequence in the received signal in order to extract the framing information from the MCM signal and further to remove the guard intervals therefrom. After the frame/timing synchronization unit 360 it follows a coarse frequency synchronization unit 362 which estimates a coarse frequency offset based on the amplitude-modulated sequence of the reference symbol of the MCM signal. In the coarse frequency synchronization unit 362, a frequency offset of the carrier frequency with respect to the oscillator frequency in the MCM receiver is determined in order to perform a frequency offset correction in a block 364. This frequency offset correction in block 364 is performed by a complex multiplication.

The output of the frequency offset correction block 364 is applied to the MCM demodulator 366 formed by the Fast Fourier Transformator 140 and the carrier-bit mapper 142 shown in FIG. 1.

In order to perform the coarse frequency synchronization described herein, an amplitude-demodulation has to be performed on a preprocessed MCM signal. The preprocessing may be, for example, the down-conversion and the analog/digital conversion of the MCM signal. The result of the amplitude-demodulation of the preprocessed MCM signal is an envelope representing the amplitude of the MCM signal.

For the amplitude demodulation a simple $alpha_{max+}$ $beta_{min-}$ method can be used. This method is described for example in Palacherla A.: DSP-μP Routine Computes Magnitude, EDN, Oct. 26, 1989; and Adams, W. T., and Bradley, J.: Magnitude Approximations for Microprocessor Implementation, IEEE Micro, vol. 3, No. 5, October 1983.

It is clear that amplitude determining methods different from the described $alpha_{max+}$ $beta_{min-}$ method can be used. For simplification, it is possible to reduce the amplitude calculation to a detection as to whether the current amplitude is above or below the average amplitude. The output signal then consists of a −1/+1 sequence which can be used to determine a coarse frequency offset by performing a correlation. This correlation can easily be performed using a simple integrated circuit (IC).

In addition, an oversampling of the signal received at the RF front end can be performed. For example, the received signal can be expressed with two times oversampling.

In accordance with a first embodiment, a carrier frequency offset of the MCM signal from an oscillator frequency in the MCM receiver is determined by correlating the envelope obtained by performing the amplitude-demodulation as described above with a predetermined reference pattern.

In case there is no frequency offset, the received reference symbol r(k) will be:

$$r(k) = S_{AM}(k) + n(k) \quad \text{(Eq. 7)}$$

wherein n(k) designates "additive Gaussian noise" and $S_{AM}$ denotes the AM sequence which has been sent. In order to simplify the calculation the additive Gaussian noise can be neglected. It follows:

$$r(k) \approx S_{AM}(k) \quad \text{(Eq. 8)}$$

In case a constant frequency offset $\Delta f$ is present, the received signal will be:

$$\tilde{r}(k) = S_{AM}(k) \cdot e^{j2\pi \Delta f k T_{MCM}} \quad \text{(Eq. 9)}$$

Information regarding the frequency offset is derived from the correlation of the received signal $\tilde{r}(k)$ with the AM sequence $s_{AM}$ which is known in the receiver:

$$\sum_{k=1}^{\frac{L}{2}} \tilde{r}(k) \cdot S_{AM}^*(k) = \sum_{k=1}^{\frac{L}{2}} |S_{AM}(k)|^2 e^{j2\pi \Delta f k T_{MCM}} \quad \text{(Eq. 10)}$$

Thus, the frequency offset is:

$$\Delta f = \frac{1}{2\pi T_{MCM}} \arg\left\{\sum_{k=1}^{\frac{L}{2}} r(k) \cdot S_{AM}^*(k)\right\} - \quad \text{(Eq. 11)}$$

$$\frac{1}{2\pi T_{MCM}} \arg\left(\sum_{k=1}^{\frac{L}{2}} |S_{AM}(k)|^2\right) \quad\quad\quad\quad (\text{Eq. 11})$$

Since the argument of $|S_{AM}(k)|^2$ is zero the frequency offset is:

$$\Delta f = \frac{1}{2\pi T_{MCM}} \arg\left(\sum_{k=1}^{\frac{L}{2}} \tilde{r}(k) \cdot S_{AM}^*\right) \quad\quad (\text{Eq. 12})$$

Figure 10:
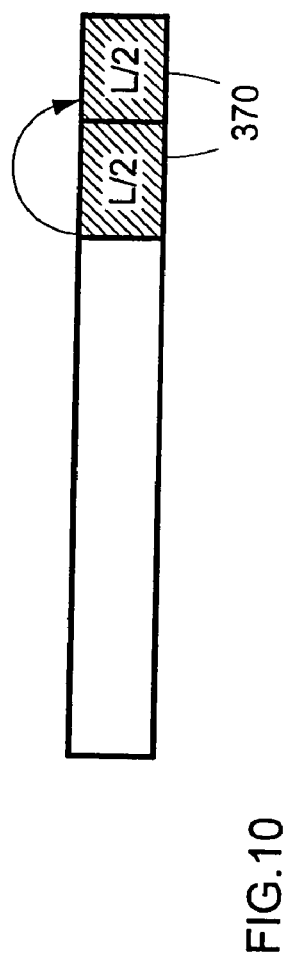
FIG. 10 shows a schematic view of a reference symbol used for performing a coarse frequency synchronization.

In accordance with a second embodiment of the coarse frequency synchronization algorithm, a reference symbol comprising at least two identical sequences 370 as shown in FIG. 10 is used. FIG. 10 shows the reference symbol of a MCM signal having two identical sequences 370 of a length of L/2 each. L designates the number of values of the two sequences 370 of the reference symbol.

AS shown in FIG. 10, within the amplitude-modulated sequence, there are at least two identical sections devoted to the coarse frequency synchronization. Two such sections, each containing L/2 samples, are shown at the end of the amplitude-modulated sequence in FIG. 10. The amplitude-modulated sequence contains a large number of samples. For a non-ambiguous observation of the phase, only enough samples to contain a phase rotation of $2\pi$ should be used. This number is defined as L/2 in FIG. 10.

Following, a mathematical derivation of the determination of a carrier frequency deviation is presented. In accordance with FIG. 10, the following equation applies for the two identical sequences 370:

$$s\left(0 < k \le \frac{L}{2}-1\right) \equiv s\left(\frac{L}{2} < k \le L\right) \quad\quad (\text{Eq. 13})$$

If no frequency offset is present, the following equation 14 will be met by the received signal:

$$r\left(k + \frac{L}{2}\right) \equiv r(k) \quad 0 < k \le \frac{L}{2} \quad\quad (\text{Eq. 14})$$

r(k) designates the values of the identical sequences. k is an index from one to L/2 for the respective samples.

If there is a frequency offset of, for example, $\Delta f$, the received signal is:

$$\tilde{r}(k) = r(k) \cdot e^{j2\pi \Delta f k T_{MCM}} \quad\quad (\text{Eq.15})$$

$$\tilde{r}\left(k + \frac{L}{2}\right) = r(k) \cdot e^{j2\pi \Delta f \left(k + \frac{L}{2}\right) T_{MCM}} \quad\quad (\text{Eq. 16})$$

r(k) designates sample values of the received portion which are based on the identical sequences. Information regarding the frequency offset is derived from the correlation of the received signal $\tilde{r}(k+L/2)$ with the received signal $\tilde{r}(k)$. This correlation is given by the following equation:

$$\sum_{k=1}^{\frac{L}{2}} \tilde{r}^*\left(k + \frac{L}{2}\right)\tilde{r}(k) = \sum_{k=1}^{\frac{L}{2}} |r(k)|^2 e^{-j2\pi\Delta f \frac{L}{2} T_{MCM}} \quad (\text{Eq. 17})$$

$\tilde{r}^*$ designates the complex conjugate of the sample values of the portion mentioned above.

Thus, the frequency offset is $$\Delta f = \frac{1}{2\pi \frac{L}{2} T_{MCM}} \arg\left(\sum_{k=1}^{\frac{L}{2}} \tilde{r}\left(k + \frac{L}{2}\right)\cdot \tilde{r}^*(k)\right) - $$

$$\frac{1}{2\pi \frac{L}{2} T_{MCM}} \arg\left(\sum_{k=1}^{\frac{L}{2}} |\tilde{r}(k)|^2\right) \quad\quad (\text{Eq. 18})$$

Since the argument of $|\tilde{r}(k)|^2$ equals zero, the frequency offset becomes $$\Delta f = \frac{1}{2\pi \frac{L}{2} T_{MCM}} \arg\left(\sum_{k=1}^{\frac{L}{2}} \tilde{r}\left(k + \frac{L}{2}\right)\cdot \tilde{r}^*(k)\right) \quad (\text{Eq. 19})$$

Thus, it is clear that in both embodiments, described above, the frequency position of the maximum of the resulting output of the correlation determines the estimated value of the offset carrier. Furthermore, as it is also shown in FIG. 9, the correction is performed in a feed forward structure.

In case of a channel with strong reflections, for example due to a high building density, the correlations described above might be insufficient for obtaining a suitable coarse frequency synchronization. Therefore, in accordance with a third embodiment of the present invention, corresponding values of the two portions (i.e., which are correlated in accordance with a second embodiment) can be weighted with corresponding values of stored predetermined reference patterns corresponding to said two identical sequences of the reference symbol. This weighting can maximize the probability of correctly determining the frequency offset. The mathematical description of this weighting is as follows:

$$\Delta f = \frac{1}{2\pi \frac{L}{2} T_{MCM}} \quad\quad\quad\quad (\text{Eq. 20})$$

$$\arg\left(\sum_{k=1}^{\frac{L}{2}} \left[\tilde{r}\left(k + \frac{L}{2}\right)\cdot \tilde{r}^*(k)\right]\cdot \left[S_{AM}(k)S_{AM}^*\left(k+\frac{L}{2}\right)\right]\right)$$

$S_{AM}$ designates the amplitude-modulated sequence which is known in the receiver, and $S_{AM}^*$ designates the complex conjugate thereof.

If the above correlations are calculated in the frequency domain, the amount of $$\sum_{k=1}^{\frac{L}{2}} \left[\tilde{r}\left(k+\frac{L}{2}\right) \cdot \tilde{r}^*(k)\right] \cdot \left[S_{AM}(k) S_{AM}^*\left(k+\frac{L}{2}\right)\right] \quad \text{(Eq. 21)}$$

is used rather than the argument. This amount is maximized as a function of a frequency correction. The position of the maximum determines the estimation of the frequency deviation. As mentioned above, the correction is performed in a feed forward structure.

Preferred embodiments for performing an echo phase offset correction when using a differential mapping in the frequency axis will be described hereinafter referring to FIGS. 12 to 15.

Systematic phase shifts stemming from echoes in multipath environments may occur between subcarriers in the same MCM symbol. These phase offsets can cause bit errors when demodulating the MCM symbol at the receiver. Thus, it is preferred to make use of an algorithm to correct the systematic phase shifts stemming from echoes in multipath environments.

Figure 12:
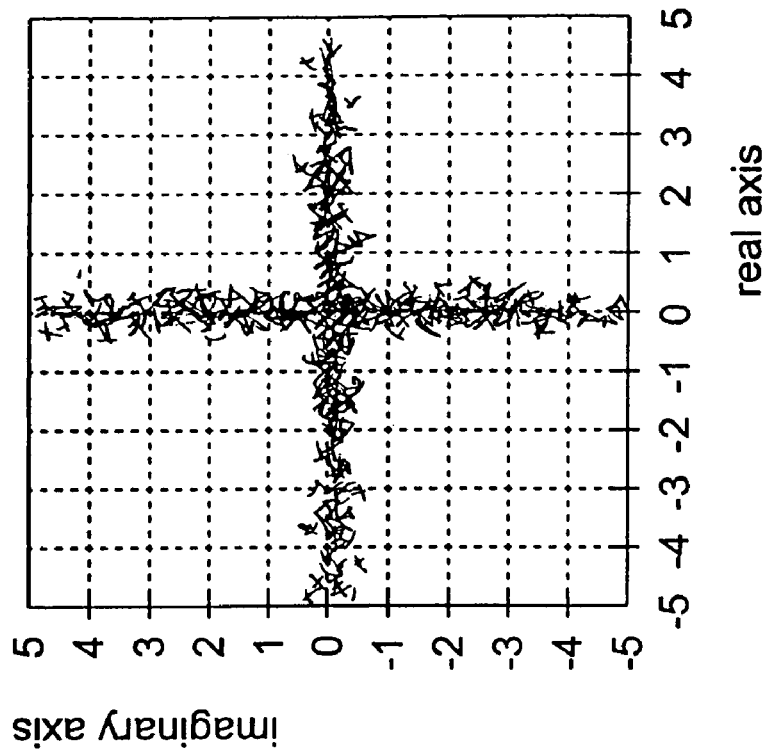
FIG. 12 shows scatter diagrams of the output of an (differential de-mapper of an MCM receiver for illustrating the effect of an echo phase offset correction.
Figure 12:
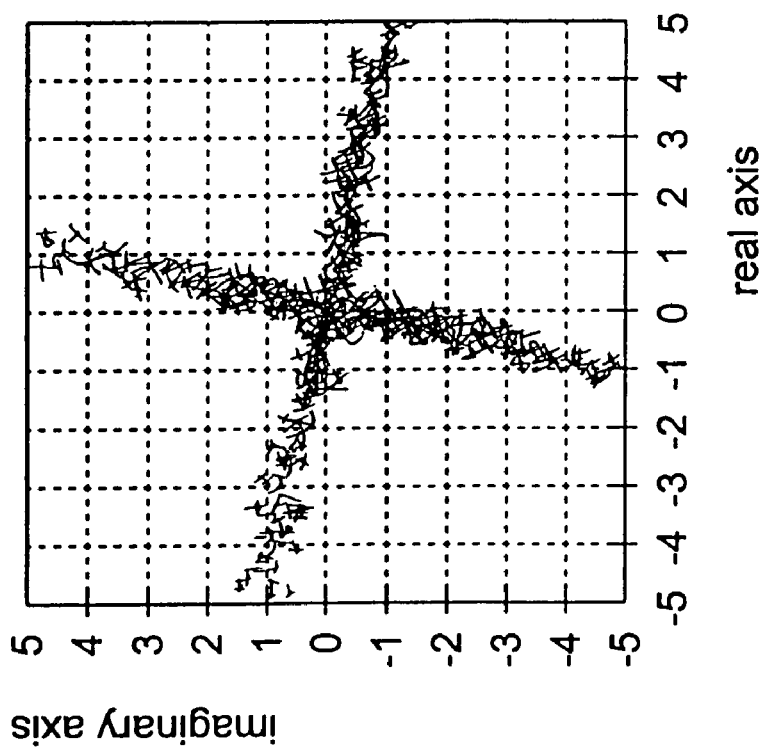

In FIG. 12, scatter diagrams at the output of a differential demapper of an MCM receiver are shown. As can be seen from the left part of FIG. 12, systematic phase shifts between subcarriers in the same MCM symbol cause a rotation of the demodulated phase shifts with respect to the axis of the complex coordinate system. In the right part of FIG. 12, the demodulated phase shifts after having performed an echo phase offset correction are depicted. Now, the positions of the signal points are substantially on the axis of the complex coordinate system. These positions correspond to the modulated phase shifts of 0°, 90°, 180° and 270°, respectively.

An echo phase offset correction algorithm (EPOC algorithm) must calculate the echo induced phase offset from the signal space constellation following the differential demodulation and subsequently correct this phase offset.

For illustration purposes, one may think of the simplest algorithm possible which eliminates the symbol phase before computing the mean of all phases of the subcarriers. To illustrate the effect of such an EPOC algorithm, reference is made to the two scatter diagrams of subcarrier symbols contained in one MCM symbol in FIG. 12. These scatter diagrams have been obtained as result of an MCM simulation. For the simulation, a channel has been used which might typically show up in single frequency networks. The echoes of this channel stretched to the limits of the MCM guard interval. The guard interval was chosen to be 25% of the MCM symbol duration in this case.

Figure 13:
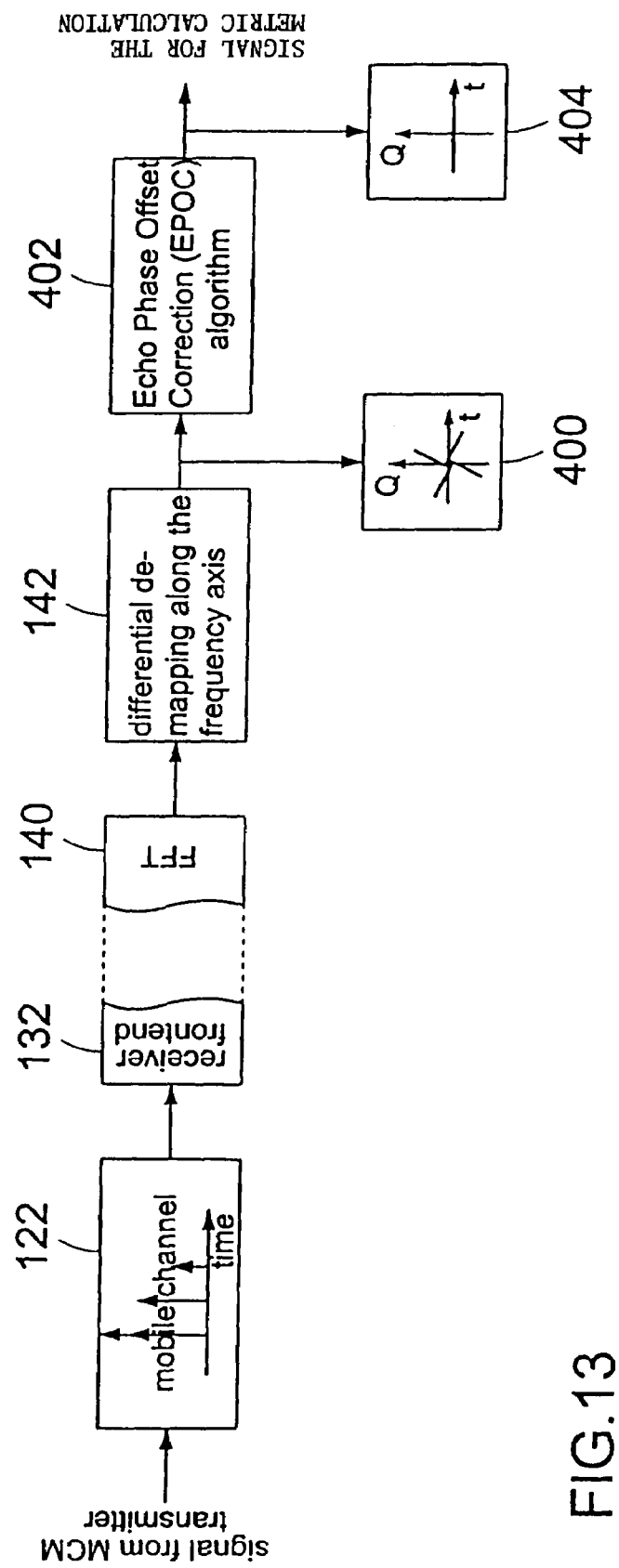
FIG. 13 shows a schematic block diagram for illustrating the position and the functionality of an echo phase offset correction unit.

FIG. 13 represents a block diagram for illustrating the position and the functionality of an echo phase offset correction device in an MCM receiver. The signal of a MCM transmitter is transmitted through the channel 122 (FIGS. 1 and 13) and received at the receiver frontend 132 of the MCM receiver. The signal processing between the receiver frontend and the fast Fourier transformator 140 has been omitted in FIG. 13. The output of the fast Fourier transformator is applied to the de-mapper, which performs a differential de-mapping along the frequency axis. The output of the de-mapper are the respective phase shifts for the subcarriers. The phase offsets of these phase shifts, which are caused by echoes in multipath environments, are illustrated by block 400 in FIG. 13, which shows an example of a scatter diagram of the subcarrier symbols without an echo phase offset correction.

The output of the de-mapper 142 is applied to the input of an echo phase offset correction device 402. The echo phase offset correction device 402 uses an EPOC algorithm in order to eliminate echo phase offsets in the output of the demapper 142. The result is shown in block 404 of FIG. 13, i.e. only the encoded phase shifts, 0°, 90°, 180° or 270° are present at the output of the correction device 402. The output of the correction device 402 forms the signal for the metric calculation which is performed in order to recover the bitstream representing the transmitted information.

Figure 14:
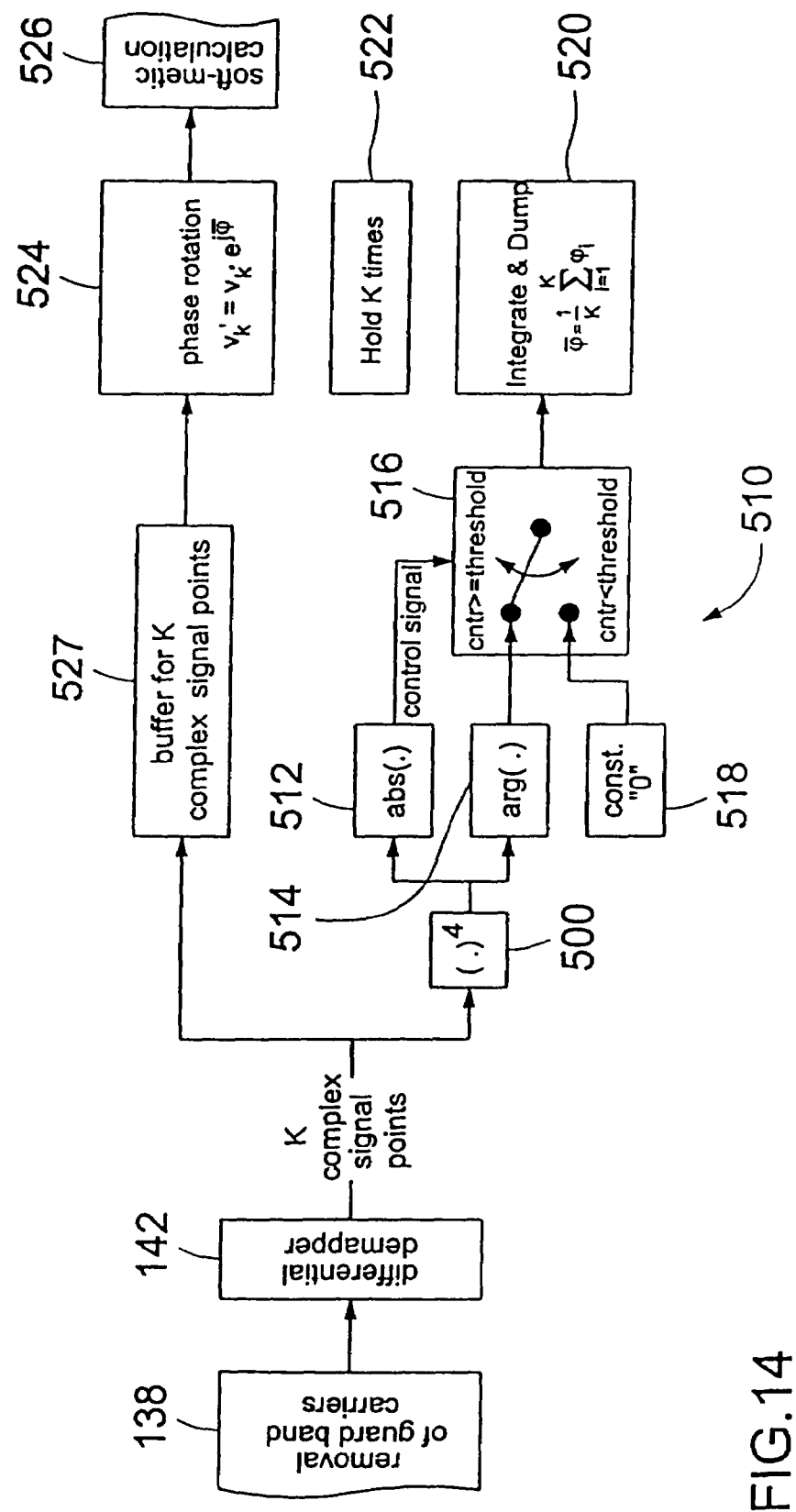
FIG. 14 shows a schematic block diagram of a preferred form of an echo phase offset correction device.

A first embodiment of an EPOC algorithm and a device for performing the same is now described referring to FIG. 14.

The first embodiment of an EPOC algorithm starts from the assumption that every received differentially decoded complex symbol is rotated by an angle due to echoes in the multipath channel. For the subcarriers equal spacing in frequency is assumed since this represents a preferred embodiment. If the subcarriers were not equally spaced in frequency, a correction factor would have to be introduced into the EPOC algorithm.

FIG. 14 shows the correction device 402 (FIG. 13) for performing the first embodiment of an EPOC algorithm.

From the output of the de-mapper 142 which contains an echo phase offset as shown for example in the left part of FIG. 12, the phase shifts related to transmitted information must first be discarded. To this end, the output of the de-mapper 142 is applied to a discarding unit 500. In case of a DQPSK mapping, the discarding unit can perform a "$(.)^4$" operation. The unit 500 projects all received symbols into the first quadrant. Therefore, the phase shifts related to transmitted information is eliminated from the phase shifts representing the subcarrier symbols. The same effect could be reached with a modulo-4 operation.

Having eliminated the information related symbol phases in unit 500, the first approach to obtain an estimation would be to simply compute the mean value over all symbol phases of one MCM symbol. However, it is preferred to perform a threshold decision before determining the mean value over all symbol phases of one MCM symbol. Due to Rayleigh fading some of the received symbols may contribute unreliable information to the determination of the echo phase offset. Therefore, depending on the absolute value of a symbol, a threshold decision is performed in order to determine whether the symbol should contribute to the estimate of the phase offset or not.

Thus, in the embodiment shown in FIG. 14, a threshold decision unit 510 is included. Following the unit 500 the absolute value and the argument of a differentially decoded symbol is computed in respective computing units 512 and 514. Depending on the absolute value of a respective symbol, a control signal is derived. This control signal is compared with a threshold value in a decision circuit 516. If the absolute value, i.e. the control signal thereof, is smaller than a certain threshold, the decision circuit 516 replaces the angle value going into the averaging operation by a value equal to zero. To this end, a switch is provided in order to disconnect the output of the argument computing unit 514 from the input of the further processing stage and connects the input of the further processing stage with a unit 518 providing a constant output of "zero".

An averaging unit 520 is provided in order to calculate a mean value based on the phase offsets $\phi_i$ determined for the individual subcarrier symbols of a MCM symbol as follows:

$$\bar{\varphi} = 1/K \sum_{i=1}^{K} \varphi_i \qquad \text{(Eq. 22)}$$

In the averaging unit 520, summation over K summands is performed. The output of the averaging unit 520 is provided to a hold unit 522 which holds the output of the averaging unit 520 K times. The output of the hold unit 522 is connected with a phase rotation unit 524 which performs the correction of the phase offsets of the K complex signal points on the basis of the mean value $\bar{\phi}$.

The phase rotation unit 524 performs the correction of the phase offsets by making use of the following equation:

$$v_k' = v_k \cdot e^{-j\bar{\varphi}} \qquad \text{(Eq. 23)}$$

In this equation, $v_k'$ designates the K phase corrected differentially decoded symbols for input into the soft-metric calculation, whereas $v_k$ designates the input symbols. As long as a channel which is quasi stationary during the duration of one MCM symbols can be assumed, using the mean value over all subcarriers of one MCM symbol will provide correct results.

A buffer unit 527 may be provided in order to buffer the complex signal points until the mean value of the phase offsets for one MCM symbol is determined. The output of the phase rotation unit 524 is applied to the further processing stage 526 for performing the soft-metric calculation.

With respect to the results of the above echo phase offset correction, reference is made again to FIG. 12. The two plots stem from a simulation which included the first embodiment of an echo phase offset correction algorithm described above. At the instant of the scatter diagram snapshot shown in the left part of FIG. 12, the channel obviously distorted the constellation in such a way, that a simple angle rotation is a valid assumption. As shown in the right part of FIG. 12, the signal constellation can be rotated back to the axis by applying the determined mean value for the rotation of the differentially detected symbols.

A second embodiment of an echo phase offset correction algorithm is described hereinafter. This second embodiment can be preferably used in connection with multipath channels that have up to two strong path echoes. The algorithm of the second embodiment is more complex than the algorithm of the first embodiment.

What follows is a mathematical derivation of the second embodiment of a method for echo phase offset correction. The following assumptions can be made in order to ease the explanation of the second embodiment of an EPOC algorithm.

In this embodiment, the guard interval of the MCM signal is assumed to be at least as long as the impulse response h[q], q=0, 1, . . . , Qh−1 of the multipath channel.

At the transmitter every MCM symbol is assembled using frequency axis mapping explained above. The symbol of the reference subcarrier equals 1, i.e. 0 degree phase shift. The optional phase shift PHI equals zero, i.e. the DQPSK signal constellation is not rotated.

Using an equation this can be expressed as $$a_k = a_{k-1} a_k^{inc} \qquad \text{(Eq. 24)}$$

with

| k | index k = 1, 2, . . . , K of the active subcarrier; |
|---|---|
| $a_k^{inc} = e^{j\frac{\pi}{2}m}$ | complex phase increment symbol; m = 0, 1, 2, 3 is the QPSK symbol number which is derived from Gray encoding pairs of 2 Bits; |
| a0 = 1 | symbol of the reference subcarrier. |

At the DFT output of the receiver the decision variables $$e_k = a_k H_k \qquad \text{(Eq. 25)}$$

are obtained with $$H_k = \sum_{i=0}^{Q_h-1} h[i] \cdot e^{-j\frac{2\pi}{K}ki} \qquad \text{(Eq. 26)}$$

being the DFT of the channel impulse response h[q] at position k.

With $|a_k|^2 = 1$ the differential demodulation yields $$v_k = e_k \cdot e_{k-1}^* = a_k^{inc} H_k H_{k-1}^* \qquad \text{(Eq. 27)}$$

For the receiver an additional phase term $\phi_k$ is introduced, which shall be used to correct the systematic phase offset caused by the channel. Therefore, the final decision variable at the receiver is $$v_k' = v_k \cdot e^{j\phi_k} = a_k^{inc} \cdot e^{j\phi_k} \cdot H_k \cdot H_{k-1}^* \qquad \text{(Eq. 28)}$$

As can be seen from the Equation 28, the useful information $a_k^{inc}$ is weighted with the product $e^{j\phi_k} \cdot H_k \cdot H_{k-1}^*$ (rotation and effective transfer function of the channel). This product must be real-valued for an error free detection. Considering this, it is best to choose the rotation angle to equal the negative argument of $H_k \cdot H_{k-1}^*$. To derive the desired algorithm for 2-path channels, the nature of $H_k \cdot H_{k-1}^*$ is investigated in the next section.

It is assumed that the 2-path channel exhibits two echoes with energy content unequal zero, i.e. at least two dominant echoes. This assumption yields the impulse response $$h[q] = c_1 \delta_0[q] + c_2 \delta_0[q - q_0] \qquad \text{(Eq. 29)}$$

with

| $c_1, c_2$: | complex coefficients representing the path echoes; |
|---|---|
| $q_0$: | delay of the second path echo with respect to the first path echo; |
| $\delta_0$: | Dirac pulse; $\delta_0[\kappa] = 1$ for k = 0 $\delta_0[\kappa] = 0$ else |

The channel transfer function is obtained by applying a DFT to Equation 29:

$$H_k = H\left(e^{j\frac{2\pi}{K}k}\right) = c_1 + c_2 \cdot e^{-j\frac{2\pi}{K}kq_0} \qquad \text{(Eq. 30)}$$

With Equation 30 the effective transfer function for differential demodulation along the frequency axis is:

$$H_k \cdot H_{k-1}^* = \left(c_1 + c_2 e^{-j\frac{2\pi}{K}kq_0}\right) \cdot \left(c_1^* + c_2^* e^{+j\frac{2\pi}{K}(k-1)q_0}\right) \quad \text{(Eq. 31)}$$
$$= c_a + c_b \cos\left(\frac{\pi}{K}q_0(2k-1)\right)$$

Assuming a noise free 2-path channel, it can be observed from Equation 31 that the symbols on the receiver side are located on a straight line in case the symbol 1+j0 has been send (see above assumption). This straight line can be characterized by a point $$c_a = |c_1|^2 + |c_2|^2 \cdot e^{-j\frac{2\pi}{K}q_0} \quad \text{(Eq. 32)}$$

and the vector $$c_b = 2c_1 c_2^* \cdot e^{-j\frac{\pi}{K}q_0} \quad \text{(Eq. 33)}$$

which determines its direction.

With the above assumptions, the following geometric derivation can be performed. A more suitable notation for the geometric derivation of the second embodiment of an EPOC algorithm is obtained if the real part of the complex plane is designated as x=Re{z}, the imaginary part as y=Im{z}, respectively, i.e. z=x+jy. With this new notation, the straight line, on which the received symbols will lie in case of a noise-free two-path channel, is $$f(x) = a + b \cdot x \quad \text{(Eq.34)}$$

with $$a = \mathrm{Im}\{c_a\} - \frac{\mathrm{Re}\{c_a\}}{\mathrm{Re}\{c_b\}} \cdot \mathrm{Im}\{c_b\} \quad \text{(Eq. 35)}$$

and $$b = -\frac{\mathrm{Im}\{c_a\} - \frac{\mathrm{Re}\{c_a\}}{\mathrm{Re}\{c_b\}} \cdot \mathrm{Im}\{c_b\}}{\mathrm{Re}\{c_a\} - \frac{\mathrm{Im}\{c_a\}}{\mathrm{Im}\{c_b\}} \cdot \mathrm{Re}\{c_b\}} \quad \text{(Eq. 36)}$$

Additional noise will spread the symbols around the straight line given by Equations 34 to 36. In this case Equation 36 is the regression curve for the cluster of symbols.

For the geometric derivation of the second embodiment of an EPOC algorithm, the angle $\phi_k$ from Equation 28 is chosen to be a function of the square distance of the considered symbol from the origin:

$$\phi_k = f_K(|z|^2) \quad \text{(Eq.37)}$$

Equation 37 shows that the complete signal space is distorted (torsion), however, with the distances from the origin being preserved.

For the derivation of the algorithm of the second embodiment, $f_K(\cdot)$ has to be determined such that all decision variables $v_k'$ (assuming no noise) will come to lie on the real axis:

$$\mathrm{Im}\{(x+jf(x)) \cdot e^{jf_K(|z|^2)}\} = 0 \quad \text{(Eq.38)}$$

Further transformations of Equation 38 lead to a quadratic equation which has to be solved to obtain the solution for $\phi_k$.

In case of a two-path channel, the echo phase offset correction for a given decision variable $v_k$ is $$v_k' = v_k \cdot e^{j\phi_k} \quad \text{(Eq.39)}$$

with $$\varphi_k = \begin{cases} -a \tan\left(\dfrac{a + b\sqrt{|v_k|^2(1+b^2) - a^2}}{-ab + \sqrt{|v_k|^2(1+b^2) - a^2}}\right) & \text{for } |v_k|^2 \geq \dfrac{a^2}{1+b^2} \\ a \tan\left(\dfrac{1}{b}\right) & \text{for } |v_k|^2 < \dfrac{a^2}{1+b^2} \end{cases} \quad \text{(Eq. 40)}$$

From the two possible solutions of the quadratic equation mentioned above, Equation 40 is the one solution that cannot cause an additional phase shift of 180 degrees.

Figure 15:
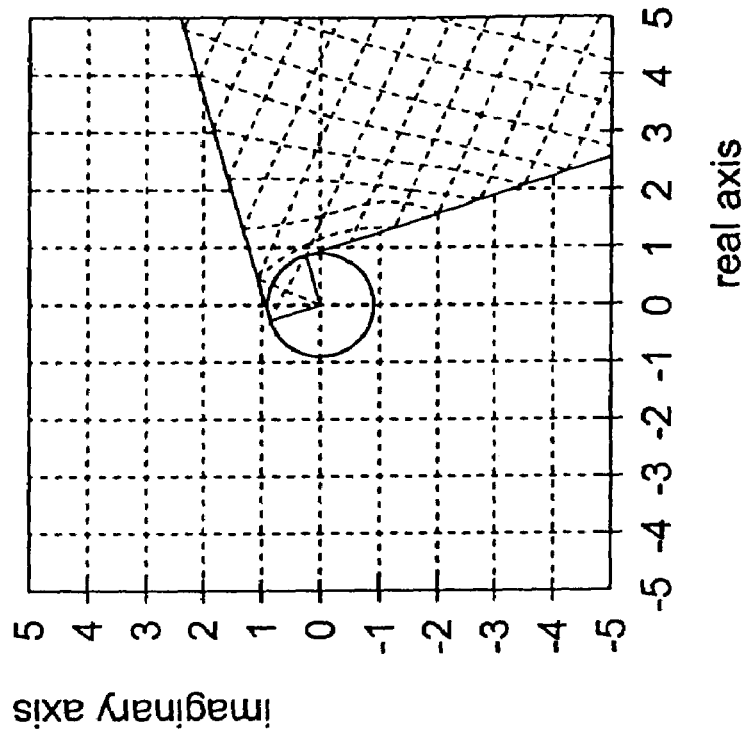
FIG. 15 shows schematic views for illustrating a projection performed by another echo phase offset correction algorithm.
Figure 15:
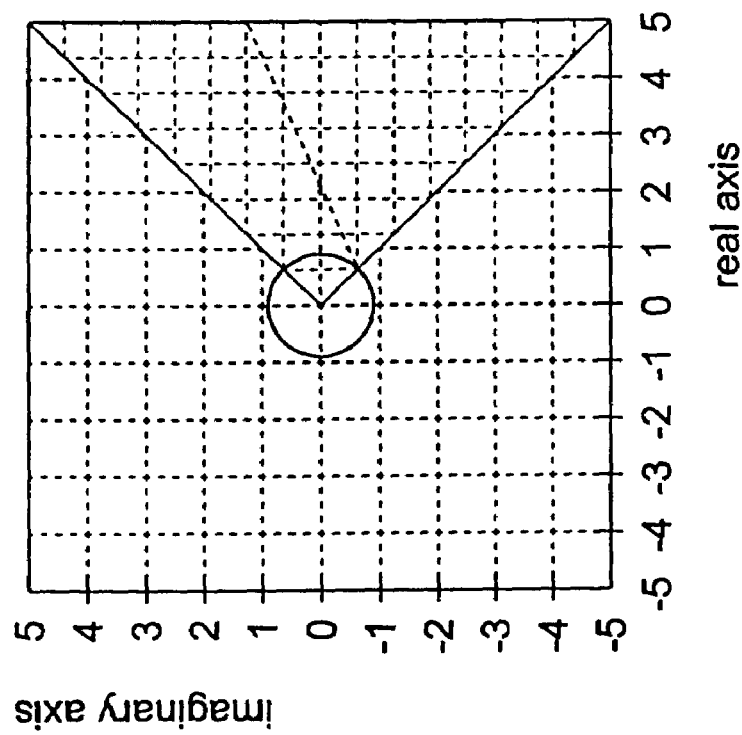

The two plots in FIG. 15 show the projection of the EPOC algorithm of the second embodiment for one quadrant of the complex plane. Depicted here is the quadratic grid in the sector |arg(z)|≦π/4 and the straight line y=f(x)=a+b·x with a =−1.0 and b=0.5 (dotted line). In case of a noise-free channel, all received symbols will lie on this straight line if 1+j0 was sent. The circle shown in the plots determines the boarder line for the two cases of Equation 40. In the left part, FIG. 15 shows the situation before the projection, in the right part, FIG. 15 shows the situation after applying the projection algorithm. By looking on the left part, one can see, that the straight line now lies on the real axis with 2+j0 being the fix point of the projection. Therefore, it can be concluded that the echo phase offset correction algorithm according to the second embodiment fulfills the design goal.

Before the second embodiment of an EPOC algorithm can be applied, the approximation line through the received symbols has to be determined, i.e. the parameters a and b must be estimated. For this purpose, it is assumed that the received symbols lie in sector |arg(z)|≦π/4, if 1+j0 was sent. If symbols other than 1+j0 have been sent, a modulo operation can be applied to project all symbols into the desired sector. Proceeding like this prevents the necessity of deciding on the symbols in an early stage and enables averaging over all signal points of one MCM symbol (instead of averaging over only ¼ of all signal points).

For the following computation rule for the EPOC algorithm of the second embodiment, $x_i$ is used to denote the real part of the i-th signal point and $y_i$ for its imaginary part, respectively (i=1, 2, . . . , K). Altogether, K values are available for the determination. By choosing the method of least squares, the straight line which has to be determined can be obtained by minimizing $$(a, b) = \arg\min_{(\tilde{a}, \tilde{b})} \sum_{i=1}^{K} \left(y_i - (\tilde{a} + \tilde{b} \cdot x_i)\right)^2 \quad \text{(Eq. 41)}$$

The solution for Equation 41 can be found in the laid open literature. It is $$b = \frac{\sum_{i=1}^{K}(x_i - \bar{x}) \cdot y_i}{\sum_{i=1}^{K}(x_i - \bar{x})^2}, \quad a = \bar{y} - \bar{x} \cdot b \qquad (Eq.\ 42)$$

with mean values $$\bar{x} = \frac{1}{N}\sum_{i=1}^{K} x_i, \quad \bar{y} = \frac{1}{N}\sum_{i=1}^{K} y_i \qquad (Eq.\ 43)$$

If necessary, an estimation method with higher robustness can be applied. However, the trade-off will be a much higher computational complexity.

To avoid problems with the range in which the projection is applicable, the determination of the straight line should be separated into two parts. First, the cluster's centers of gravity are moved onto the axes, following, the signal space is distorted. Assuming that a and b are the original parameters of the straight line and a is the rotation angle, $f_K(\cdot)$ has to be applied with the transformed parameters $$b' = \frac{b \cdot \cos(\alpha) - \sin(\alpha)}{\cos(\alpha) + b \cdot \sin(\alpha)}, \quad a' = a \cdot (\cos(\alpha) - b' \cdot \sin(\alpha)) \qquad (Eq.\ 44)$$

Besides the two EPOC algorithms explained in the above section, different algorithms can be designed that will, however, most likely exhibit a higher degree of computational complexity.

The invention claimed is:

1. A method of performing a fine frequency synchronization compensating for a carrier frequency deviation from an oscillator frequency in a multi-carrier demodulation system capable of carrying out a differential phase decoding of multi-carrier modulated signals, said signals comprising a plurality of symbols, each symbol being differentially coded in the direction of the frequency axis, said method comprising the steps of:
   a) determining a phase difference between phases of the same carrier in different symbols;
   b) determining a frequency offset by eliminating phase shift uncertainties related to the transmitted information from said phase difference making use of a M-PSK decision device; and
   c) performing a feedback correction of said carrier frequency deviation based on said determined frequency offset, wherein
   said steps a) and b) are performed for a plurality of carriers in said symbols,
   an averaged frequency offset is determined by averaging said determined frequency offsets of said plurality of carriers, and
   said feedback correction of said frequency deviation is performed based on said averaged frequency offset.

2. The method according to claim 1, wherein said step a) comprises the step of determining a phase difference between phases of the same carrier in symbols which are adjacent in the time axis direction.

3. The method according to claim 1, wherein said step b) comprises the step of eliminating phase shift uncertainties corresponding to M-ary phase shifts.

4. An apparatus for performing a fine frequency synchronization compensating for a carrier frequency deviation from an oscillator frequency, for a multi-carrier demodulation system capable of carrying out a differential phase decoding of multi-carrier modulated signals, said signals comprising a plurality of symbols, each symbol being defined by
   phase differences between simultaneous carriers having different frequencies, said apparatus comprising:
   means for determining respective phases of the same carrier in different symbols;
   M-PSK decision device for eliminating phase shift uncertainties related to the transmitted information from said phases to determine respective phase deviations;
   means for determining a frequency offset by determining a phase difference between said phase deviations; and
   means for performing a feedback correction of said frequency deviation based on said determined frequency offset;
   wherein said means for determining respective phases comprises means for determining respective phases of the same carrier in symbols which are adjacent in the time axis direction.

5. The apparatus according to claim 4, further comprising:
   means for determining an averaged frequency offset by averaging determined frequency offsets of a plurality of carriers, wherein
   said means for performing a feedback correction performs said feedback correction of said frequency deviation based on said averaged frequency offset.

6. The apparatus according to claim 4, wherein said means for performing a feedback correction of said frequency deviation comprises a numerical controlled oscillator and a complex multiplier.

7. The apparatus according to claim 6, wherein said means for performing a feedback correction of said frequency deviation further comprises a low path filter preceding said numerical controlled oscillator.

* * * * *